United States Patent
Lu et al.

(10) Patent No.: US 9,629,125 B2
(45) Date of Patent: Apr. 18, 2017

(54) NETWORK NODE AND METHOD FOR ALLOCATING UPLINK RADIO RESOURCES

(71) Applicant: Telefonaktiebolaget L M Ericsson (publ), Stockholm (SE)

(72) Inventors: Qianxi Lu, Beijing (CN); Qingyu Miao, Beijing (CN); Zhenshan Zhao, Beijing (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 82 days.

(21) Appl. No.: 14/654,208

(22) PCT Filed: Dec. 21, 2012

(86) PCT No.: PCT/SE2012/051486
§ 371 (c)(1),
(2) Date: Jun. 19, 2015

(87) PCT Pub. No.: WO2014/098689
PCT Pub. Date: Jun. 26, 2014

(65) Prior Publication Data
US 2015/0334693 A1 Nov. 19, 2015

(51) Int. Cl.
H04W 72/04 (2009.01)
H04W 92/18 (2009.01)
H04W 76/02 (2009.01)

(52) U.S. Cl.
CPC ....... *H04W 72/0406* (2013.01); *H04W 72/04* (2013.01); *H04W 72/044* (2013.01); *H04W 76/023* (2013.01); *H04W 92/18* (2013.01)

(58) Field of Classification Search
None
See application file for complete search history.

(56) References Cited

U.S. PATENT DOCUMENTS

2009/0170522 A1 7/2009 Tirkkonen et al.
2011/0268006 A1* 11/2011 Koskela ............... H04W 72/121
370/312

(Continued)

FOREIGN PATENT DOCUMENTS

JP 2011250043 A 12/2011
JP 2012044331 A 3/2012

(Continued)

OTHER PUBLICATIONS

Communication under Rule 71(3) EPC (Intention to Grant), related European Application No. 120818660, dated May 25, 2016, 102 pages.

(Continued)

*Primary Examiner* — Adnan Baig
(74) *Attorney, Agent, or Firm* — Nicholson De Vos Webster & Elliott, LLP

(57) ABSTRACT

Method in a network node for allocating Uplink (UL) radio resources to a pair of Device to Device (D2D) devices comprising a first wireless device and a second wireless device, the network node and the D2D pair being comprised in a wireless communications network, includes assigning a common Downlink (DL) control signalling message, for the pair of D2D devices, and allocating UL radio resources to the first and second wireless device, so that the UL radio resources allocated to the first wireless device are separated from the UL radio resources allocated to the second wireless device, by applying one or more of a time offset, a frequency offset, and a code-division multiplexing offset between the UL radio resources allocated to the first wireless device and the UL radio resources allocated to the second wireless device, wherein the allocating UL radio resources is based on the common DL control signalling message.

20 Claims, 10 Drawing Sheets

(56) References Cited

U.S. PATENT DOCUMENTS

2012/0083283 A1* 4/2012 Phan .................. H04W 72/048
 455/450
2012/0129540 A1* 5/2012 Hakola ............... H04W 72/042
 455/450

FOREIGN PATENT DOCUMENTS

| WO | 2011022684 A2 | 2/2011 |
|---|---|---|
| WO | 2012024141 A1 | 2/2012 |
| WO | 2012048464 A1 | 4/2012 |
| WO | WO-2012/091420 A2 | 7/2012 |
| WO | WO-2012/091420 A3 | 10/2012 |

OTHER PUBLICATIONS

Decision to Grant and Search Report for related Japanese Application No. 20150549307, dated Jul. 28, 2016, 71 pages.
Decision to Grant for related European Application No. 12818660.8, mailed Sep. 15, 2016, 2 pages.
PCT Notification of Transmittal of the International Search Report and Written Opinion of the International Searching Authority for Counterpart PCT Application No. PCT/SE2012/051486, (Sep. 4, 2013), 11 pages.
PCT Notification of Transmittal of the International Preliminary Report on Patentability for Counterpart PCT Application No. PCT/SE2012/051486, (Dec. 3, 2014), 30 pages.
3GPP TS 36.213: "Evolved Universal Terrestrial Radio Access (E-UTRA); Physical layer procedures," 3rd Generation Partnership Project, Technical Specification Group Radio Access Network, (Release 10), (Mar. 2011), 115 pages.
Lei Lei, et al.: "Operator controlled device-to-device communications in LTE-advanced networks", IEEE Wireless Communications, IEEE Service Center, vol. 19, No. 3, (Jun. 1, 2012), pp. 96-104.

* cited by examiner

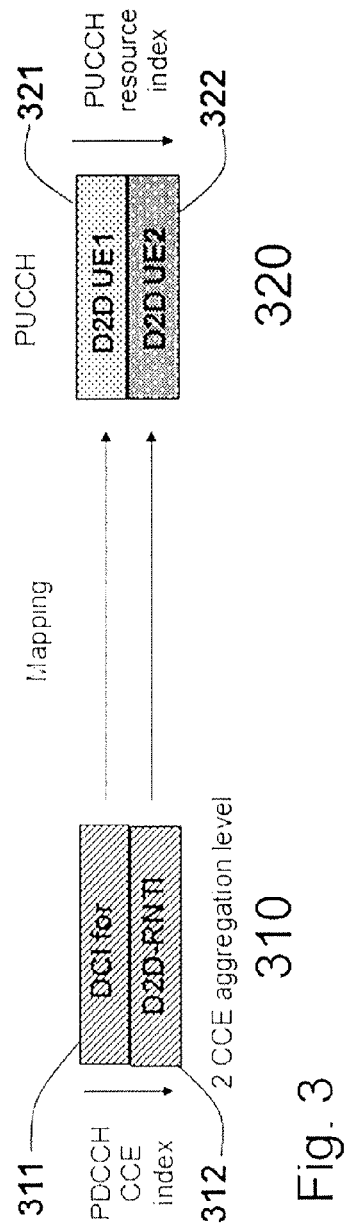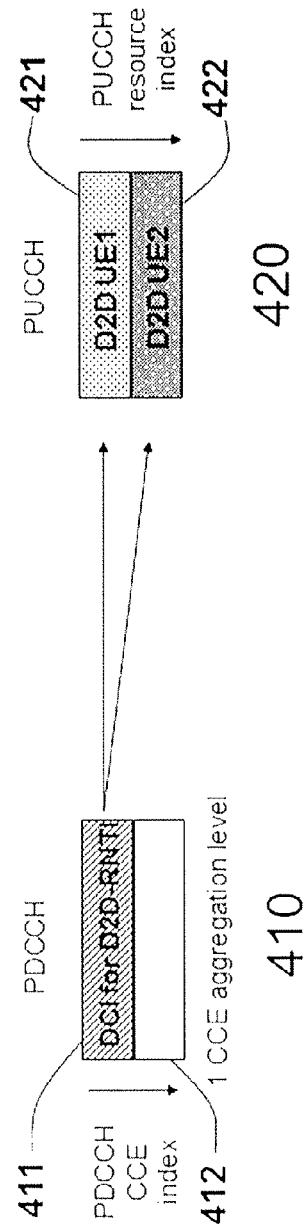

NETWORK NODE AND METHOD FOR ALLOCATING UPLINK RADIO RESOURCES

CROSS-REFERENCE TO RELATED APPLICATIONS

This application is a National stage of International Application No. PCT/SE2012/051486, filed Dec. 12, 2012, which is hereby incorporated by reference.

TECHNICAL FIELD

Embodiments herein relate to a network node and a method therein. In particular, embodiments herein relate to allocating uplink, UL, radio resources to a pair of Device to Device, D2D, devices.

BACKGROUND

Devices such as wireless devices are also known as e.g. User Equipments (UE), mobile terminals, wireless terminals and/or mobile stations. Devices are enabled to communicate wirelessly in a wireless communications system or wireless communication system, sometimes also referred to as a cellular radio system or cellular networks. The communication may be performed e.g. between two devices, between a device and a regular telephone and/or between a device and a server via a Radio Access Network (RAN) and possibly one or more core networks, comprised within the wireless communications system.

Devices may further be referred to as mobile telephones, cellular telephones, or laptops with wireless capability, just to mention some further examples. The devices in the present context may be, for example, portable, pocket-storable, hand-held, computer-comprised, or vehicle-mounted mobile devices, enabled to communicate voice and/or data, via the RAN, with another entity, such as device or a server.

The wireless communications system covers a geographical area which is divided into cell areas, wherein each cell area being served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the devices within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for devices. The 3GPP has undertaken to evolve further the UTRAN and GSM based radio access network technologies.

According to 3GPP GSM EDGE Radio Access Network (GERAN), a device has a multi-slot class, which determines the maximum transfer rate in the uplink and downlink direction. EDGE is an abbreviation for Enhanced Data rates for GSM Evolution. In the end of 2008 the first release, Release 8, of the 3GPP Long Term Evolution (LTE) standard was finalized and later releases have also been finalized.

Recent developments of the 3GPP LTE facilitate accessing local Internet Protocol (IP) based services in the home, office, public hot spot or even outdoor environments. One of the important use cases for the local IP access and local connectivity involves the direct communication between devices in close proximity, typically less than a few 10s of meters, but sometimes up to a few hundred meters of each other.

In network-controlled so-called Device-to-Device (D2D) communications, a network such as a radio access network assists wireless devices that are in the proximity of each other to discover one another. This process is referred to as device discovery. The wireless devices may then establish a direct link referred to as D2D bearer establishment, rather than a link via the base station. In fact, when two devices communicate with each other via a cellular base station, the communication path involves an uplink hop and a downlink hop. Both of these hops have associated resources, as opposed to the single hop direct D2D link. In the context of this disclosure, the expression Downlink (DL) is used for the transmission path from the base station to the wireless device. The expression Uplink (UL) is used for the transmission path in the opposite direction i.e. from the wireless device to the base station.

The initiation of the establishment of the D2D link may be made by the radio access network or by any of the wireless devices of the D2D pair. In network initiated D2D link establishment, the network realizes that two communicating wireless devices are in proximity of each other. In device initiated D2D link establishment, the wireless devices discover the proximity of each other and also some of their capabilities which is necessary for them to establish a D2D link, similar to Bluetooth.

In network-controlled D2D communication, a network control function performs at least one of: a) provisioning of a discovery signal to be used between two devices to determine their proximity and/or D2D link estimation, b) resource assignment for the D2D discovery signal and/or a D2D data channel and/or a D2D control channel, c) relaying of information between the at least two devices, and d) configuration of connection parameters for the at least two devices of the D2D link, such as power setting, e.g., actual, min, max, coding and modulation schemes, segmentation configuration, e.g., transport block sizes, parameters and/or security keys for encryption/integrity protection and protocol parameters.

A transmission in an LTE or Evolved Universal Terrestrial Radio Access Network (E-UTRAN) is based on Orthogonal Frequency Division Multiplexing (OFDM), whose format may be modeled as an OFDM time-frequency grid. The OFDM time-frequency grid is comprised in one axis of frequency values and in the other axis of time. The frequency axis is subdivided in a number of frequency sub-carriers, with a spacing that may typically correspond to 15 kHz, while the time axis is subdivided in OFDM symbol intervals.

Within the grid, a Physical Resource Block (PRB or RB) is a unit of transmission resource consisting of twelve consecutive sub-carriers in the frequency domain and one time slot, 0.5 ms, in the time domain.

The direct communication mode, or D2D communication, enables a number of potential gains over the traditional cellular technique, because D2D devices are much closer to one another than cellular devices that have to communicate via a cellular access point, e.g., a base station:

Capacity gain: First, radio resources, e.g., OFDM RB, between the D2D and cellular layers may be reused, i.e., reuse gain. Second, a D2D link uses a single hop between the transmitter and receiver points as opposed to the 2-hop link via a cellular access point, i.e., hop gain.

Peak rate gain: due to the proximity and potentially favorable propagation conditions, modulation and coding scheme (MCS) of higher order may be applied, so that, the maximum achievable data rate may be further improved, i.e., proximity gain;

Latency gain: When the devices communicate over a direct link, the base station forwarding is short cut and the end-to-end latency may decrease.

According to the current LTE protocol, a network node exerts control over signalling of wireless devices in a wireless communications network through, for example, Radio Resource Control (RRC) signalling. There are two types of RRC signalling: broadcast signalling, e.g., System Information Block/Master Information Block (SIB/MIB), and device dedicated signalling. In turn, the wireless devices in the network feed back to the network node signalling through HARQ signalling in order to acknowledge the correct reception of signalling through an ACKnowledgement (ACK) or the incorrect reception of the signalling via a Negative ACKnowledgement (NACK), which then leads to a request for retransmission of the improperly received signalling. In particular, the wireless device may feedback with an Acknowledgement/Negative Acknowledgement (ACK/NACK) on the Uplink (UL) Physical Uplink Control CHannel (PUCCH). Since the content of the HARQ signalling is obviously dependent on the reception of a specific wireless device, broadcast signalling, which is signalled to multiple devices, is not suitable to carry this type of signalling. Dedicated signalling, on the other hand, is better suited of the HARQ signalling because it is intended for a specific device.

However, current specifications such as the current LTE protocol, do not provide an optimized performance of the control and HARQ signalling processes for D2D communications.

SUMMARY

It is therefore an object of embodiments herein to provide a way of improving the performance in a wireless communications network comprising cellular and D2D communications.

According to a first aspect of embodiments herein, the object is achieved by a method in a network node for allocating UL radio resources to a pair of D2D devices. The pair of D2D devices comprises a first wireless device and a second wireless device. The network node and the D2D pair are comprised in a wireless communications network. The network node assigns a common DL control signalling message for the pair of D2D devices. The network node then allocates UL radio resources to the first wireless device and the second wireless device, so that the UL radio resources allocated to the first wireless device are separated from the UL radio resources allocated to the second wireless device. This is done by applying one or more of a time offset, a frequency offset and a code-division multiplexing offset between the UL radio resources allocated to the first wireless device and the UL radio resources allocated to the second wireless device. The allocating UL radio resources is based on the common DL control signalling message.

According to a second aspect of embodiments herein, the object is achieved by a network node for allocating uplink radio resources to a pair of D2D devices. The pair of D2D devices comprises a first wireless device and a second wireless device. The network node and the D2D pair are comprised in a wireless communications network.

The network node comprises an assigning circuit configured to assign a common DL control signalling message for the pair of D2D devices. The network node further comprises an allocating circuit configured to allocate UL radio resources to the first wireless device and the second wireless device, so that the UL radio resources allocated to the first wireless device are separated from the UL radio resources allocated to the second wireless device. This is done by applying one or more of a time offset, a frequency offset and a code-division multiplexing offset between the UL radio resources allocated to the first wireless device and the UL radio resources allocated to the second wireless device, wherein to allocate UL radio resources is based on the common DL control signalling message.

Since the network node 110 assigns a common DL control signalling message, for the pair of D2D devices, DL radio resources, such as Downlink Control Information (DCI) and the Physical Downlink Shared CHannel (PDSCH) are saved.

By saving DL radio resources according to embodiments herein, an advantage is that the performance of the system is improved by increasing the capacity of the system and decreasing the latency.

Also, since the network node 110 allocates UL radio resources to each of the members of the D2D pair, so that the resources are separated, collision of simultaneous UL signaling from the two members of the D2D pair is avoided. Thus, a further advantage according to embodiments herein is that backwards compatibility with the cellular HARQ signaling system is preserved. Furthermore, the performance of the system is improved by decreasing signaling interference.

A further advantage according to embodiments herein is that by providing a system with improved performance, subscribed satisfaction is increased.

BRIEF DESCRIPTION OF THE DRAWINGS

Examples of embodiments herein are described in more detail with reference to attached drawings in which:

FIG. 3 is a schematic diagram illustrating embodiments of an UL radio resource allocation FIG. 4 is a schematic diagram illustrating embodiments of an UL radio resource allocation.

DETAILED DESCRIPTION

Figure 1:
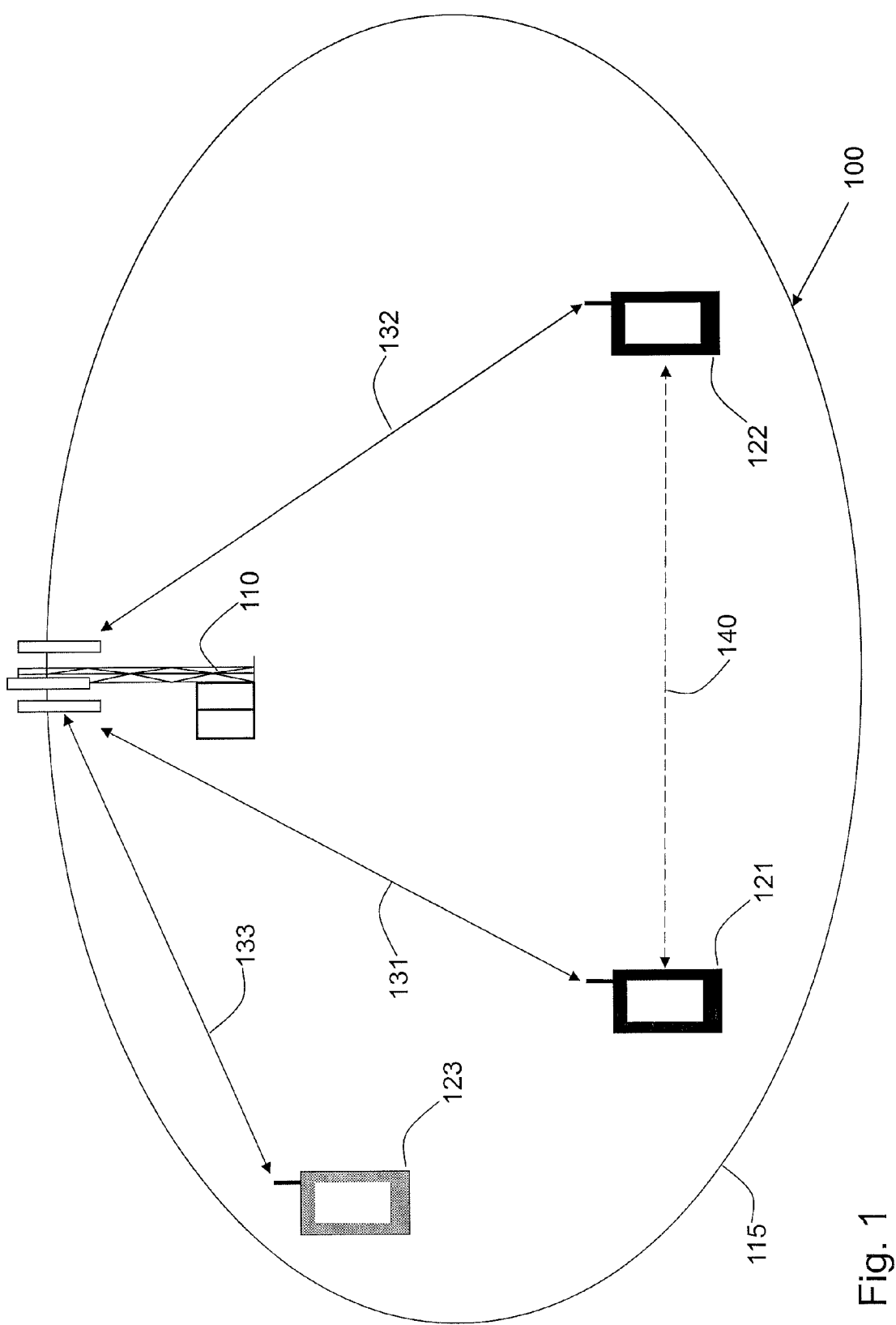
FIG. 1 is a schematic block diagram illustrating embodiments in a wireless communications system.

As part of the development of embodiments herein, a problem will first be identified and discussed.

In the D2D network, there may be signalling which may be the same for the D2D devices of a D2D pair, such as control signalling from a network node. In fact, in the D2D network, a type of control signalling different from those mentioned in the Background section above is introduced, for Medium Access Control Control Element (MAC CE) and/or RRC signalling, which concerns control signalling for the D2D pair. Examples of such a type of control signalling are the Time Division Duplexing (TDD) configuration of the pair or the beacon/Reference Signal (RS) configuration of the pair. If this same signalling is sent to each of the D2D devices of the D2D pair in a traditional, dedicated way, radio resources such as the Downlink Control Information (DCI) and Physical Downlink Shared CHannel (PDSCH) may be wasted, affecting the overall capacity and latency of the system. It would not be practical either to rely on a type of periodical broadcasting, such as the SIB/MIB because, periodical transmission would probably consume more resources than required for HARQ re-transmission. In fact, this would be even worse, if, for example, there were a large number of D2D pairs in a wireless communications network, which may be possible in the future to support all kinds of wireless communication. A way to avoid duplicating signalling according to embodiments herein, may be to send common signalling to both D2D devices of the D2D pair, as will be described later in greater detail. This may be done by, for example, using a single identifier common to the D2D pair, such as a Radio Network Temporary Identifier (RNTI), in this case, D2D-RNTI. This way, both devices may decode the DCI by the common D2D-RNTI, and thus only one DCI is necessary. A second way to avoid duplicating signalling according to embodiments herein, may be by using a Physical Downlink Shared Channel (PDSCH) common to the D2D pair to carry the signalling, which also involves avoiding a waste of PDSCH. However, this may create a problem in the case that each of the D2D devices of the D2D pair transmits signalling on the UL, simultaneously, since the transmissions can lead to interference problems. Such is a case for an Acknowledgement/Negative Acknowledgement (ACK/NACK) feedback in response to a Physical Downlink Control Channel (PDCCH) transmission. In some instances, such as in the case of an ACK/NACK response, the feedback may be different for each device of the D2D pair, depending on their individual reception of the common signalling. If the individual reception of the common signalling is different for each device of the D2D pair, a common feedback response is not viable. In the current systems, and in the particular case of the ACK/NACK response, since the PDSCH signalling is scheduled by the same DCI, the resource allocation of the PUCCH carrying the ACK/NACK response is calculated based on the resource location of the DCI. This may cause interference by the ACK/NACK responses of the two devices, which would take place simultaneously. This is in fact the reason why ACK/NACK feedback is not currently supported for SIB/MIB, since SIB/MIB is currently used for broadcasting to all wireless devices in a serving cell, so it is hard to decide to re-transmit or not, considering different quality and status of the receiving wireless devices. As stated above, this problem would be applicable to any type of simultaneous signalling from the members of the D2D pair, in response to a single, common DL signalling.

Current specifications do not consider the use of this common identifier or D2D-RNTI to save DCI and PDSCH for D2D pair common DL signalling, and do not consider the UL interference problem between D2D transmission and reception, such as that occurring in ACK/NACK feedback.

Therefore, the embodiments described below aim to overcome this problem, and provide a method for managing D2D control signalling so that usage of radio resources is minimized and simultaneous UL transmission from each individual device in the pair of D2D devices, such as in the case of ACK/NACK feedback, is supported, while avoiding interference issues.

FIG. 1 depicts a wireless communications network 100 in which embodiments herein may be implemented. The wireless communications network 100 is a wireless communication network such as an LTE, Wideband Code Division Multiple Access (WCDMA) Global System for Mobile Communications (GSM) network, any 3GPP cellular network, any 3GPP2 cellular network, a Worldwide Interoperability for Microwave Access (WiMAX) network, a WiFi network, or any wireless network or system.

Wireless communications network 100 comprises a cellular network and a D2D network.

The wireless communications network 100 comprises a network node 110. The network node 110 may be a base station such as e.g. an eNB, eNodeB, or a Home Node B, a Home eNode B, femto Base Station, BS, pico BS or any other network unit capable to serve a device or a machine type communication device in a mixed wireless communications network 100. In some particular embodiments, network node 110 may be a stationary relay node, a mobile relay node, or a device, such as a user equipment. The mixed wireless communications network 100 covers a geographical area which is divided into cell areas, wherein each cell area is served by a network node, although, one network node may serve one or several cells. In the example depicted in FIG. 1, wherein the network node 110 is a base station, the network node 110 serves a cell 115. The network node 110 may be of different classes such as e.g. macro eNodeB, home eNodeB or pico base station, based on transmission power and thereby also cell size. Typically, wireless communications network 100 may comprise more cells similar to 115, served by their respective network nodes. This is not depicted in FIG. 1 for the sake of simplicity. The network node 110 may support one or several communication technologies, and its name will depend on the technology and terminology used. In 3GPP LTE network nodes, which may be referred to as eNodeBs or even eNBs, may be directly connected to one or more core networks.

Wireless communications network 100 also comprises at least a first wireless device 121, a second wireless device 122, and a third wireless device 123, which are located within the cell 115. The wireless devices 121, 122 and 123 may further be referred to as mobile telephones, mobile terminals, wireless terminals and/or mobile stations, cellular telephones, or laptops with wireless capability, just to mention some further examples. The first, second and third wireless devices 121, 122 and 123 in the present context may be, for example, portable, pocket-storable, hand-held, computer-comprised, or vehicle-mounted mobile devices, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) devices, devices equipped with a wireless interface, such as a printer or a file storage device or any other radio network unit capable of communicating over a D2D link and over a radio link in a cellular communications system. In some embodiments, the wireless devices 121, 122 and 123 may further be referred to as network nodes. The wireless devices 121, 122 and 123 are wireless, i.e., they are enabled to communicate wirelessly in the wireless communications network, sometimes also referred to as a cellular radio system or cellular network. The communication may be performed e.g., between two devices, between a device and a regular telephone and/or between a device and a server. The communication may be performed e.g., via a RAN and possibly one or more core networks, comprised within the wireless communications network.

In this example, the first wireless device 121 and second wireless device 122 are also located within the cell 115. However, in other embodiments, either the first wireless device 121 and/or the second wireless device 122 may be located in another cell which is in the neighbourhood of the cell 115, but within radio range of each other. The first wireless device 121 and second wireless device 122 are configured to communicate within the wireless communications network 100. The communication may be performed via the network node 110 or via another network node serving the neighbouring cell. The communication may take place over radio links such as, e.g., a radio link 131, and a radio link 132, respectively. This may happen when the first wireless device 121 and the second wireless device 122 are present in the cell 115 served by the network node 110, or when they are in the adjacent cell served by the other network node. The first wireless device 121 and the second wireless device 122 are also capable of communicating with each other, and/or with other wireless devices using wireless D2D communication over, for example, a D2D link 140. The first wireless device 121 and the second wireless device 122 are comprised in the D2D network 100.

The third wireless device 123 is comprised in the cellular network and in some embodiments, it is configured to communicate within the mixed wireless communications network 100 via the network node 110 over a radio link 133, when the third wireless device 123 is present in the cell 115 served by the network node 110.

Each of the devices 121, 122 and 123 may be configured to communicate using one of the cellular or D2D communication, or with both. However for the purposes of explanation, in the following discussion, the first wireless device 121 and the second wireless device 122 are understood to be using D2D communication, and the third wireless device 123 is understood to be using cellular communication.

Figure 2:
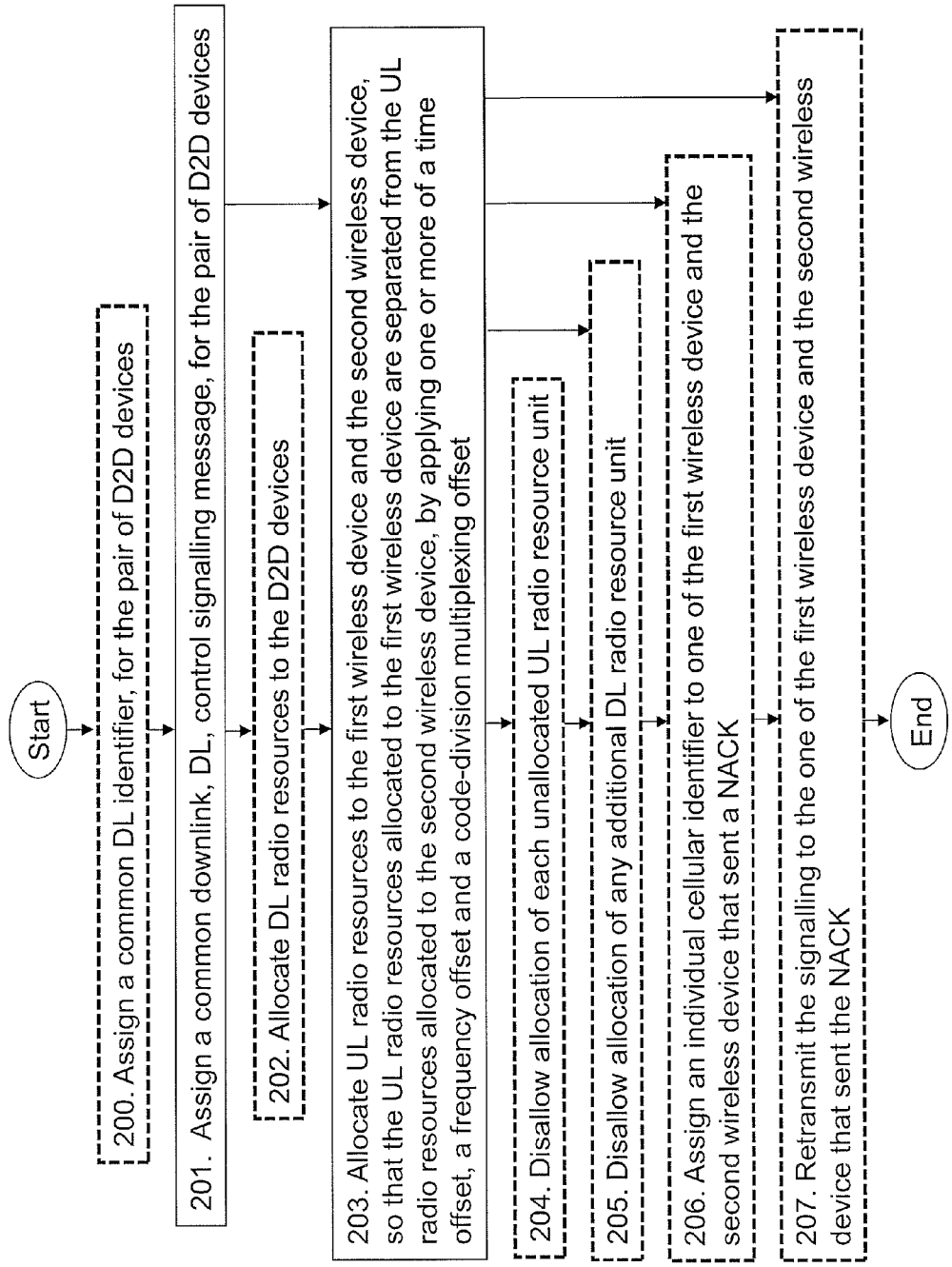
FIG. 2 is a flowchart depicting embodiments of a method in a network node.

Embodiments of a method in the network node 110 for allocating uplink, UL, radio resources to a pair of D2D devices 121, 122 will now be described with reference to the flowchart depicted in FIG. 2. As mentioned above, the network node 110 and the D2D pair are comprised in the wireless communications network 100. The D2D pair 121, 122 comprises the first wireless device 121 and the second wireless device 122.

The method comprises the following actions, which actions may as well be carried out in another suitable order than that described below. In some embodiments, all the actions may be carried out, whereas in other embodiments only some action/s may be carried out.

Action 200

In this action, the network node 110 assigns a common DownLink (DL) identifier, for the pair of D2D devices 121, 122. This is done to be able to identify the D2D devices 121, 122 as a unity.

In some particular embodiments, the common DL identifier is a D2D-Radio Network Temporary Identifier (D2D-RNTI).

Action 201

In this action, the network node 110 assigns a common DL control signalling message, to the pair of D2D devices 121, 122. This is done to avoid duplicating signalling (and hence radio resources) that is common to the two devices 121, 122 of the D2D pair, via the traditional device dedicated signalling.

In some particular embodiments, the common DL control signalling message is a DCI. To allocate a DCI to a specific device pair, the DCI may be scrambled by the identifier specific to the D2D pair 121, 122, such as the D2D-RNTI. The D2D pair specific D2D-RNTI is known by the D2D pair. By blindly searching the DCI scrambled by the D2D-RNTI of the D2D pair 121, 122 itself, in the DCI set located in the PDCCH, each device of the D2D pair 121, 122 may find the DCI allocated to it.

Action 202

The assignment of a common DL control signalling message to the D2D pair 121, 122, has implications for the allocation of DL radio resources, such as the PDCCH, to the D2D pair 121, 122. This is due to the fact that the present method is based on the premise of a system, such as the current LTE specification, wherein the amount of allocated DL radio resources to the D2D pair are allocated to a control signalling message such as the DCI.

In this action, network node 110 may allocate DL radio resources 310, 410, 510, 610, 710, 810, 910 to the D2D devices 121, 122 for the common DL control signalling message. DL radio resources 310, 410, 510, 610, 710, 810, 910 will be described in detail below, in reference to FIGS. 3-9. The number of DL resource units 311, 312, 411, 412, 511, 512, 611, 711, 712, 811-814, 911-918 (also described in detail later) allocated to the D2D pair, i.e., the aggregation level, may vary depending on the channel quality of each of the wireless devices 121, 122 in the D2D pair. The aggregation level, in the present systems may be 1, 2, 4 or 8. However, some embodiments herein may be applied to aggregation levels higher than 8, such as even aggregation levels, i.e., aggregation levels that are even numbers, as one of skill in the art will appreciate.

The aggregation level may have a minimum limit. In the particular case of the DCI, according to the current LTE specification, the minimum aggregation level is 1 CCE.

In some of the embodiments herein described, the DL radio resources comprise a PDCCH, and the UL radio resources comprise a PUCCH. In further particular embodiments, the PUCCH may comprise an ACK/NACK feedback.

The present method is also based on the premise that the network node 110 allocates UL radio resources, such as of the PUCCH carrying ACK/NACK feedback, to a D2D pair 121, 122, by default, based on the amount of allocated DL radio resources to the D2D pair 121, 122.

This may be done, by default, as follows. The DL radio resources comprise a number of DL radio resource units and the UL radio resources comprise a number of UL radio resource units. For example, in some particular embodiments, a DL radio resource unit may be a Control Channel Element (CCE). In some particular embodiments, the UL radio resource unit may be a resource block, if the resource units are quantified in a time/frequency domain. In other embodiments, a UL radio resource unit may be a joint division of a time/frequency/code domain.

The number of UL radio resource units that may be allocated by default to each one of the DL radio resource units may be done according to a ratio, i.e., 1:1, 1:2, 1:3 corresponding to a delta-shift 1, 2, and 3, respectively. The delta-shift, e.g. present in the 3GPP specification, is meant to reduce interference between adjacent codes on the UL, such as for adjacent codes of the PUCCH, which is Code Division Multiplexed (CDMd). According to the current 3GPP specification, the deltaPUCCH-Shift may take the value of 1, 2, 3, which denotes the PUCCH resource interval applied when mapping UL resources from the DL resources. For example, adjacent CCEs on the PDCCH may be mapped to the PUCCH with 0/1/2 resource index in-between, in order to alleviate the interference between transmission from different PUCCH codes.

The default allocation of UL radio resources based on the DL radio resources according to a delta-shift 1:1, 1:2, 1:3 is illustrated in FIGS. 3-9, and is described below, in relation to each figure. How this default allocation of UL radio resources to the D2D pair 121, 122, as it will now be described, relates to the allocation of UL radio resources of the embodiments herein, will be explained in detail further down below, in relation to action 203.

FIG. 3 depicts DL radio resources 310, comprising, in this embodiment, DL radio resource units 311 and 312. UL radio resources 320, comprise UL radio resource units 321 and 322. In this figure, each of the DL radio resource units 311, 312 is configured to be allocated one of the UL radio resource units 321, 322, i.e., 1:1 ratio or delta-shift 1.

FIG. 4 depicts DL radio resources 410, comprising, in this embodiment, DL radio resource units 411 and 412. UL radio resources 420, comprise UL radio resource units 421 and 422. In this figure, each of the DL radio resource units 411, 412 is configured to be allocated one of the UL radio resource units 421, 422, i.e., 1:1 ratio or delta-shift 1.

Figure 5:
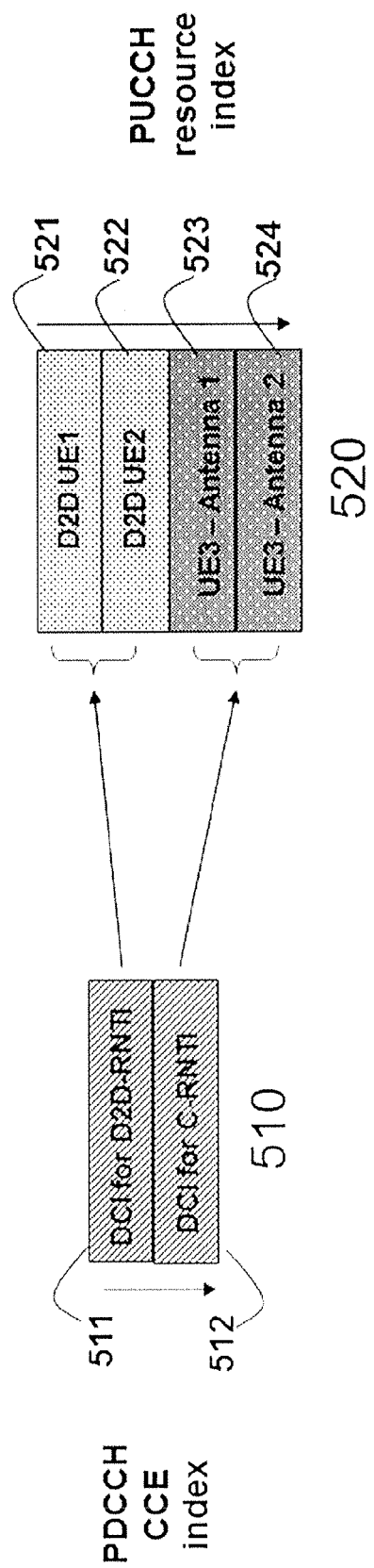
FIG. 5 is a schematic diagram illustrating embodiments of an UL radio resource allocation.

FIG. 5 depicts DL radio resources 510, comprising, in this embodiment, DL radio resource units 511 and 512. UL radio resources 520, comprise UL radio resource units 521, 522, 523 and 524. In this figure, each of the DL radio resource units 411, 412 is configured to be allocated two of the UL radio resource units 521, 522, 523 and 524, i.e., 1:2 ratio or delta-shift 2.

Figure 6:
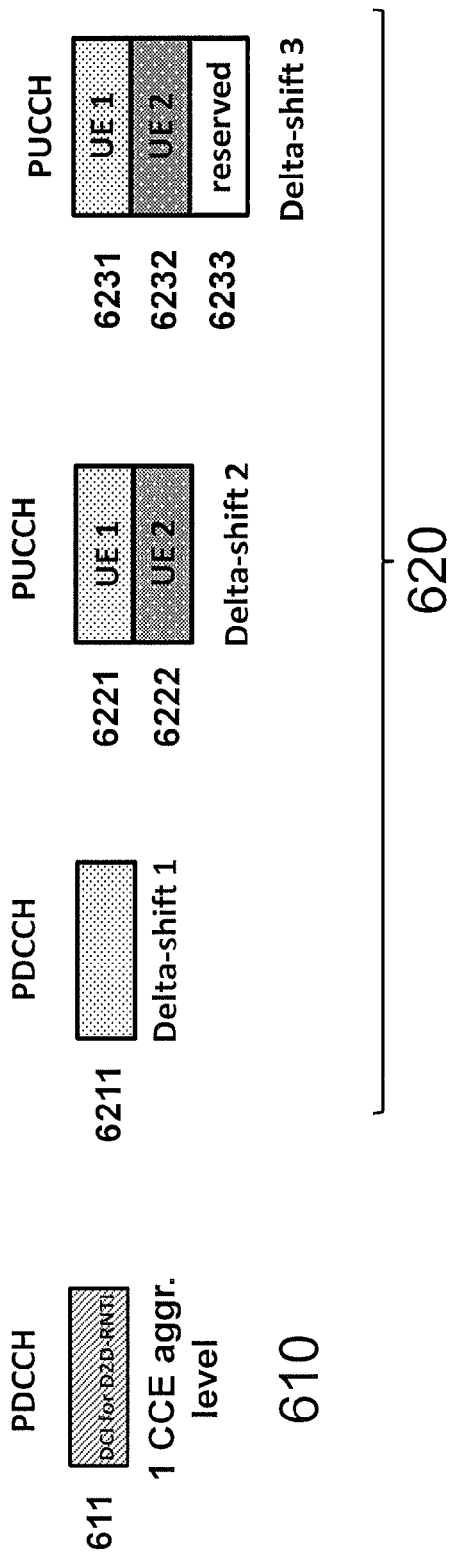
FIG. 6 is a schematic diagram illustrating embodiments of an UL radio resource allocation.

FIG. 6 depicts DL radio resources 610, comprising, in this embodiment, DL radio resource unit 611. UL radio resources 620, comprise UL radio resource units 6211, 6221, 6222, and 6231-6233. In this figure, the DL radio resource unit 611 is configured to be allocated one UL radio resource unit 6211, i.e., 1:1 ratio or delta-shift 1, two UL radio resource units 6221, 6222, i.e., 1:2 ratio or delta-shift 2, or three UL radio resource units 6231, 6232, and 6233, i.e., 1:3 ratio or delta-shift 3.

Figure 7:
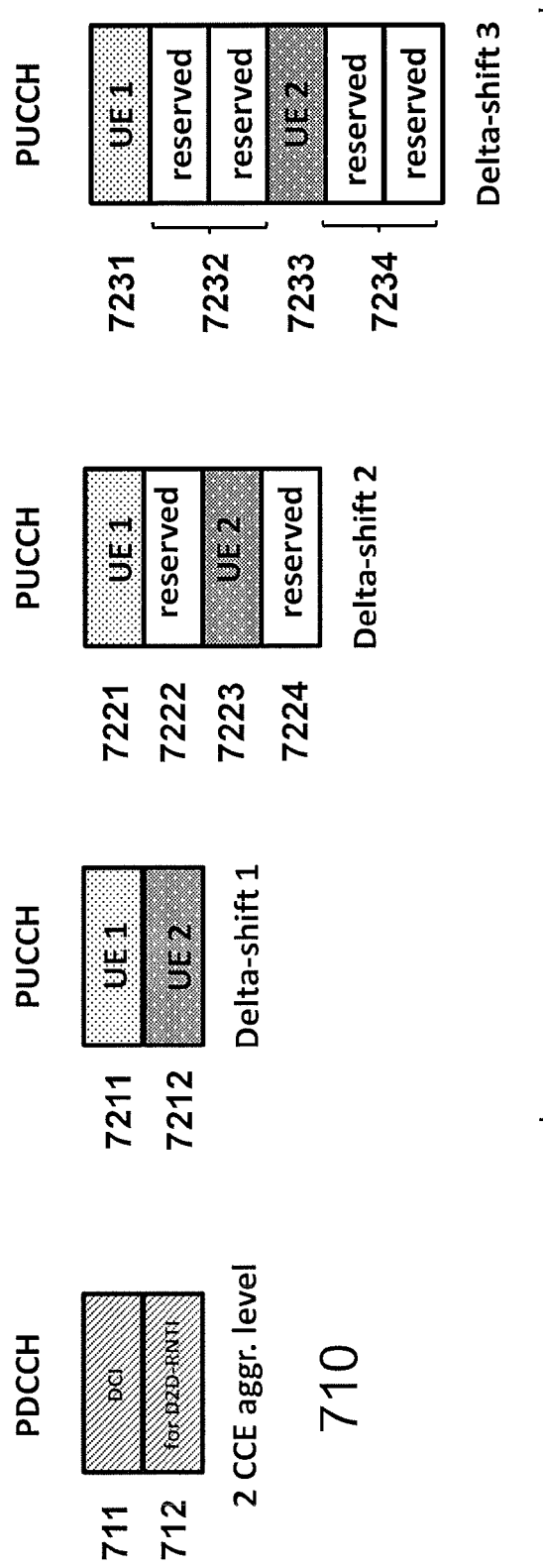
FIG. 7 is a schematic diagram illustrating embodiments of an UL radio resource allocation.

FIG. 7 depicts DL radio resources 710, comprising, in this embodiment, DL radio resource units 711 and 712. UL radio resources 720, comprise UL radio resource units 7211, 7212, 7221-7224, and 7231-7234. In this figure, each of the DL radio resource units 711 and 712 is configured to be allocated one UL radio resource unit 7211, 7212, i.e., 1:1 ratio or delta-shift 1, two UL radio resource units 7221-7224, i.e., 1:2 ratio or delta-shift 2, or three UL radio resource units 7231-7234, i.e., 1:3 ratio or delta-shift 3.

Figure 8:
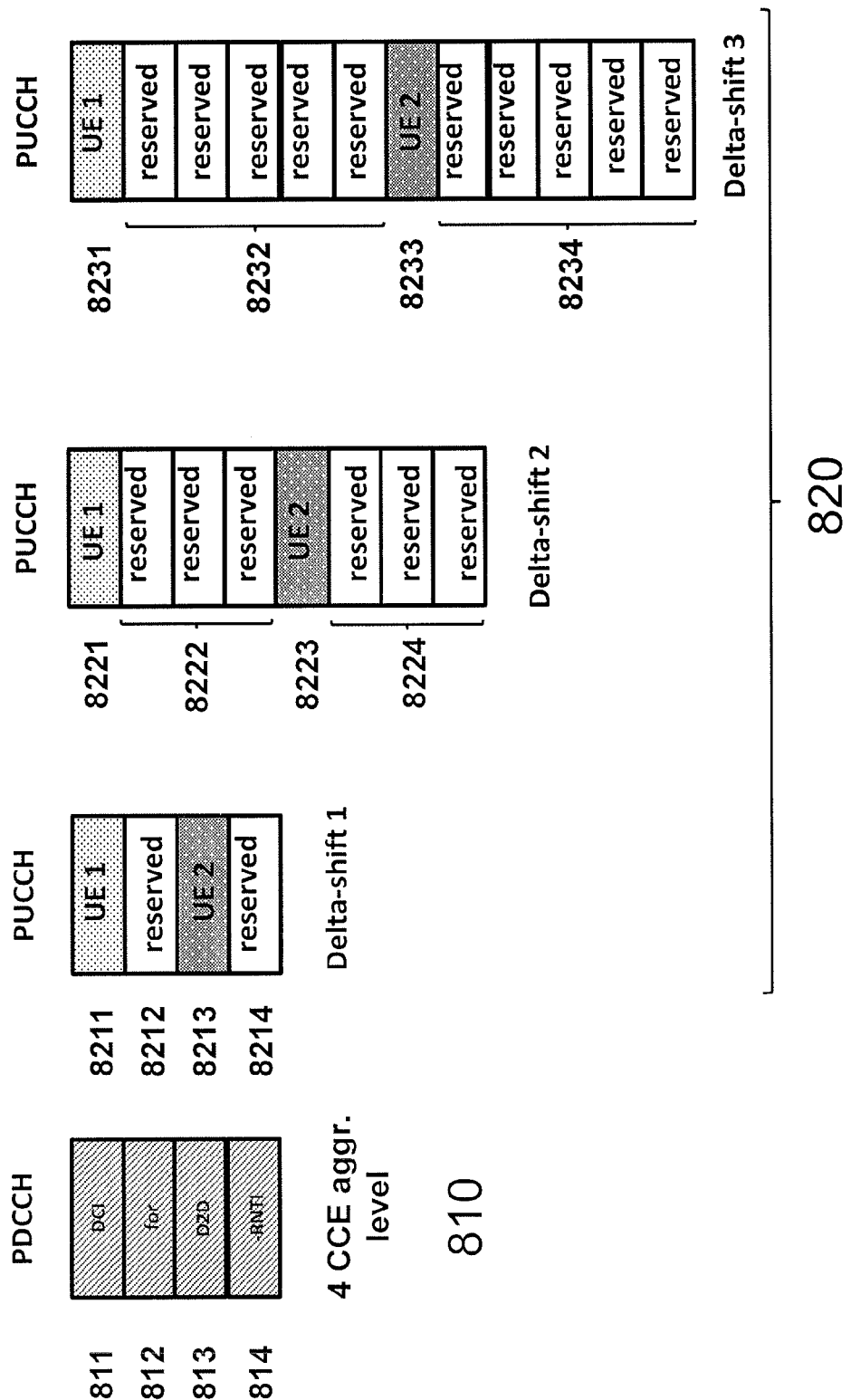
FIG. 8 is a schematic diagram illustrating embodiments of an UL radio resource allocation.

FIG. 8 depicts DL radio resources 810, comprising, in this embodiment, DL radio resource units 811-814. UL radio resources 820, comprise UL radio resource units 8211-8214, 8221-8224, and 8231-8234. In this figure, each of the DL radio resource units 811-814 is configured to be allocated one UL radio resource unit 8211-8214, i.e., 1:1 ratio or delta-shift 1, two UL radio resource units 8221-8224, i.e., 1:2 ratio or delta-shift 2, or three UL radio resource units 8231-8234, i.e., 1:3 ratio or delta-shift 3.

Figure 9:
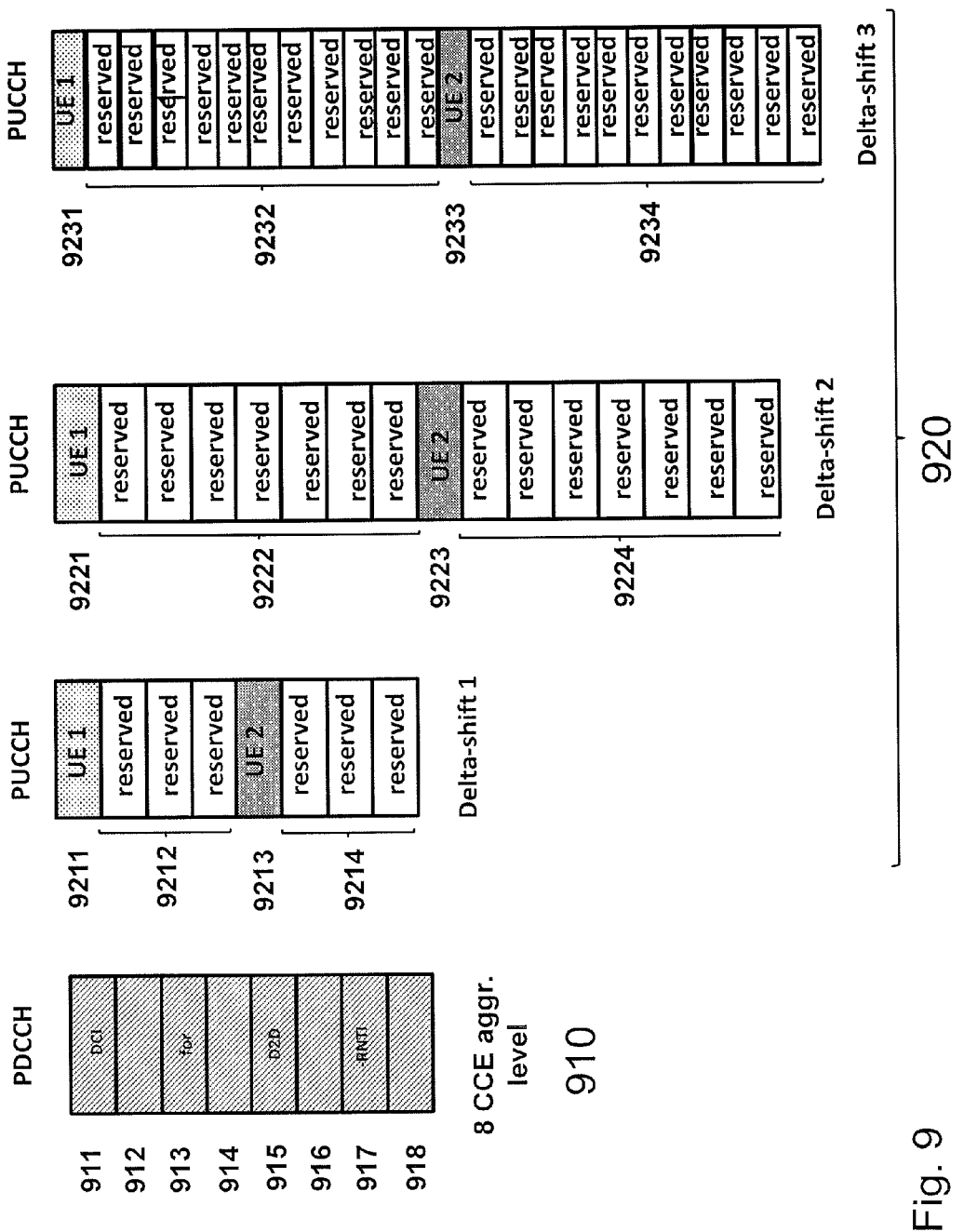
FIG. 9 is a schematic diagram illustrating embodiments of an UL radio resource allocation.

FIG. 9 depicts DL radio resources 910, comprising, in this embodiment, DL radio resource units 911-918. UL radio resources 820, comprise UL radio resource units 9211-9214, 9221-9224, and 9231-9234. In this figure, each of the DL radio resource units 911-918 is configured to be allocated one UL radio resource unit 9211-9214, i.e., 1:1 ratio or delta-shift 1, two UL radio resource units 9221-9224, i.e., 1:2 ratio or delta-shift 2, or three UL radio resource units 9231-9234, i.e., 1:3 ratio or delta-shift 3.

The default allocation between DL radio resources, to the PDCCH in the figures and the UL radio resources, to the PUCCH in the figures, is based on the index of PDCCH and PUCCH, which describes the minimum resource units of the two channels.

Each of these figures show DL radio resources 310, 410, 510, 610, 710, 810, 910 and UL radio resources 320, 420, 520, 620, 720, 820, 920 comprised in the wireless communications network 100. The DL radio resources 310, 410, 510, 610, 710, 810, 910 comprise a number of DL radio resource units 311, 312, 411, 412, 511, 512, 611, 711, 712, 811-814, 911-918. The UL radio resources 320, 420, 520, 620, 720, 820, 920 comprise a number of UL radio resource units 321, 322, 421, 422, 521-524, 6211, 6221, 6222, 6231-6233, 7211, 7212, 7221-7224, 7231-7234, 8211-8214, 8221-8224, 8231-8234, 9211-9214, 9221-9224, 9231-9234, as will be described in detail below, in relation to FIGS. 3-9.

Action 203

As explained above, the allocation of UL radio resources 320, 420, 520, 620, 720, 820, 920 may be based on the allocation of DL radio resources 310, 410, 510, 610, 710, 810, 910. The embodiments herein aim at overcoming the potential interference from UL resources carrying information simultaneously transmitted by each of the devices in the D2D pair 121, 122. Such is the case of the embodiments in which the UL resource 320, 420, 520, 620, 720, 820, 920 may carry a PUCCH, and the UL radio resources 320, 420, 520, 620, 720, 820, 920 may comprise Acknowledgement/Negative Acknowledgement, ACK/NACK, feedback. Embodiments herein avoid this interference by allocating the UL resources 320, 420, 520, 620, 720, 820, 920 allocated by default to the D2D pair 121, 122, as described above, separately for each one of the devices in the pair 121, 122.

The network node 110 will effectuate this allocation by allocating UL radio resources 320, 420, 520, 620, 720, 820, 920 to the first wireless device 121 and the second wireless device 122, so that the UL radio resources 321, 421, 521, 6221, 6231, 7211, 7221, 7231, 8211, 8221, 8231, 9211, 9221, 9231 allocated to the first wireless device 121 are separated from the UL radio resources 322, 422, 522, 6222, 6232, 7212, 7223, 7233, 8213, 8223, 8233, 9213, 9223, 9233 allocated to the second wireless device 122. This is performed by applying one or more of a time offset, a frequency offset and a code-division multiplexing offset between the UL radio resources allocated to the first wireless device 121 and the UL radio resources allocated to the second wireless device 122. The allocating UL radio resources 320, 420, 520, 620, 720, 820, 920 is based on the common DL control signalling message, as will be described in detail below in relation to FIGS. 3-9. In these figures, the number of UL and DL radio resource units depicted is only representative, and it is not meant to be limiting to all embodiments, but is has been chosen merely for illustrative purposes with simple examples. In other embodiments, the number of UL and DL radio resource units may increase, following the same allocation scheme as that shown in FIGS. 3-9.

The application of one or more of the time, frequency and a code-division multiplexing offsets may depend on the number of DL radio resources allocated to the D2D pair 121, 122 and the DL:UL allocation ratio, i.e., the delta-shift, as follows.

In a first group of embodiments, each of the DL radio resource units 311, 312, 711, 712, 811-814, 911-918 may be configured to be allocated one 321, 322, 7211, 7212, 8211-8214, 9211-9214, i.e., delta-shift 1, two 7221-7224, 8221-8224, 9221-9224, i.e., delta-shift 2, or three 7231-7234, 8231-8234, 9231-9234, i.e., delta-shift 3, of the UL radio resource units. In these embodiments, the allocating of DL radio resources 310, 710, 810, 910 to the D2D devices 121, 122 may comprise allocating an even number of DL radio resource units 311, 312, 711, 712, 811-814, 911-918 associated with the common DL control signalling message. This even number of DL radio resource units 311, 312, 711, 712, 811-814, 911-918 may be, by default, configured to be allocated an even number of UL radio resource units associated with the common DL control signalling message 321, 322, 7211, 7212, 7221-7224, 7231-7234, 8211-8214, 8221-8224, 8231-8234, 9211-9214, 9221-9224, 9231-9234. In these embodiments, the one or more of a time offset, a frequency offset and a code-division multiplexing offset may be a first DL channel resource-based offset. According to this first DL channel resource-based offset, the allocating of UL radio resources 320, 720, 820, 920 by applying the first DL channel resource-based offset may further comprise allocating one UL radio resource unit 321, 7211, 7221, 7231, 8211, 8221, 8231, 9211, 9221, 9231 in a first half of the even number of UL radio resource units to the first wireless device 121 and allocating one UL radio resource unit 322, 7212, 7223, 7233, 8213, 8223, 8233, 9213, 9223, 9233 in a second half of the even number UL radio resource units to the second wireless device 122.

In some particular embodiments, the even number of DL radio resource units may be one of two, four or eight.

In the simplest case scenario of this first group of embodiments, which is illustrated in a representative example in FIG. 3, the D2D pair 121, 122 may have been allocated two DL radio resource units 311 and 312. In this case, the number of UL radio resource units may also be two: 321 and 322, as the allocation ratio may be 1:1. Hence, the network node 110 may allocate an UL radio resource unit such as unit 321 to one of the devices in the D2D pair, for example the first wireless device 121, and it may allocate the other UL radio resource unit 322 to the other device in the D2D pair, in this example, the second wireless device 122. In FIGS. 3-9, UE1 refers to the first wireless device 121 and UE2 refers to the second wireless device 122.

This offset allocation may guarantee that the transmission from the different members of the D2D pair 121, 122, may not interfere with each other. In the example shown in FIG. 3, where the DL resources are 2 CCEs, each of the devices 121, 122 in the D2D pair may transmit on a different resource block in the UL, thus avoiding interference with one another. A similar example to that of FIG. 3, is shown also in FIG. 7 for UL resource units 7211 and 7212, i.e., delta shift 1.

A similar process may take place if the number of DL radio resource units allocated to the D2D pair 121, 122 may be even, but higher than two, such as four or eight, and the allocation ratio may be 1:1, i.e., delta-shift 1, which means that the number of UL radio resource units may also be even. This is shown in FIG. 8, depicting an embodiment with four DL radio resource units 811-814 allocated to the D2D pair 121, 122, and FIG. 9, depicting an embodiment with eight DL radio resource 911-918 units allocated to the D2D pair 121, 122. In both of these cases, as well as in others where the number of radio resource units allocated to the pair may be even, the network node 110 may allocate one UL radio resource unit in a first half of the even number of UL radio resource units to one of the devices in the D2D pair, for example the first wireless device 121, and it may allocate another UL radio resource unit a second half of the even number UL radio resource units to the other device in the D2D pair, in this example, the second wireless device 122. In the embodiment of FIG. 8, UL radio resource unit 8211 is allocated to the first wireless device 121, i.e., UE1, and UL radio resource unit 8213 is allocated to the second wireless device 122, i.e., UE2. In the embodiment of FIG. 9, UL radio resource unit 9211 is allocated to the first wireless device 121, i.e., UE1, and UL radio resource unit 9213 is allocated to the second wireless device 122, i.e., UE2.

A similar process may take place in the embodiments in which the number of DL radio resource units allocated to the D2D pair may be even, such as two, four or eight, and the allocation ratio may be 1:2, i.e., delta shift 2, or 1:3, i.e., delta shift 3, which means that the number of UL radio resource units allocated to the D2D pair may also be even. This is shown in FIG. 7 for an allocation of two DL radio resource units 711, 712. For an allocation ratio of 1:2, i.e., delta shift 2, UL radio resource unit 7221 may be allocated to the first wireless device 121, i.e., UE1, and UL radio resource unit 7223 may be allocated to the second wireless device 122, i.e., UE2. Similarly, when the allocation ratio is 1:3, i.e., delta-shift 3, UL radio resource unit 7231 may be allocated to the first wireless device 121, i.e., UE1, and UL radio resource unit 7233 may be allocated to the second wireless device 122, i.e., UE2. This is also shown in FIG. 8 for an allocation of four DL radio resource units 811-814. For an allocation ratio of 1:2, i.e., delta shift 2, UL radio resource unit 8221 may be allocated to the first wireless device 121, i.e., UE1, and UL radio resource unit 8223 may be allocated to the second wireless device 122, i.e., UE2. Similarly, when the allocation ratio may be 1:3, i.e., delta shift 3, UL radio resource unit 8231 may be allocated to the first wireless device 121, i.e., UE1, and UL radio resource unit 8233 may be allocated to the second wireless device 122, i.e., UE2. This is also shown in FIG. 9 for an allocation of eight DL radio resource units 911-918. For an allocation ratio of 1:2, i.e., delta-shift 2, UL radio resource unit 9221 may be allocated to the first wireless device 121, i.e., UE1, and UL radio resource unit 9223 may be allocated to the second wireless device 122, i.e., UE2. Similarly, when the allocation ratio may be 1:3, i.e., delta-shift 3, UL radio resource unit 9231 may be allocated to the first wireless device 121, i.e., UE1, and UL radio resource unit 9233 may be allocated to the second wireless device 122, i.e., UE2.

In the examples illustrated on FIGS. 7-9, in which the number of UL resource units is higher than 2, the allocating of UL radio resources 720, 820, 920 to the first wireless device 121 and the second wireless device 122 by applying the first DL channel resource-based offset may be done so that they are separated by all unallocated UL radio resource units in the first half of the even number of UL radio resource units 7222, 7224, 7232, 7234, 8212, 8214, 8222, 8224, 8232, 8234, 9212, 9214, 9222, 9224, 9232, 9234. That is, in the graphical representation of FIGS. 7-9, the first wireless device 121 is allocated the first UL radio resource unit in the first half of the UL radio resources allocated to the DL radio resources, and the second wireless device 122 is allocated the first UL radio resource unit in the second half of the UL radio resources allocated to the DL radio resources. This may be done in these embodiments to minimize the potential interference between the UL transmission of the first wireless device 121 and the second wireless device 122. However, in other embodiments, any UL radio resource unit of all the UL radio resource units allocated to the D2D pair 121, 122 may be allocated to the first wireless device 121 and any other of all the UL radio resource units allocated to the D2D pair 121, 122 may be allocated to the second wireless device 122, as long as the UL radio resource units allocated to each of the devices 121, 122 in the D2D pair are separated. The allocating of UL radio resources 720, 820, 920 to the first wireless device 121 and the second wireless device 122 by applying the first DL channel resource-based offset may be implemented by defining a different UL resource mapping scheme, which may be pre-defined by the specification or dynamically controlled by network signalling.

In a second group of embodiments, each of the DL radio resource units 411, 412 may be configured to be allocated one of the UL radio resource units 421, 422, i.e., 1:1 ratio. In this second group of embodiments, the allocating DL radio resources 410 to the D2D devices 121, 122 may comprise allocating one DL radio resource unit 411 associated with the common DL control signalling message to the D2D pair 121, 122. This one DL radio resource unit 411 may be, by default, configured to be allocated one UL radio resource unit 421 associated with the common DL control signalling message. In these embodiments, the one or more of a time offset, a frequency offset and a code-division multiplexing offset may be a second DL channel resource-based offset.

According to this second DL channel resource-based offset, the allocating of UL radio resources 420 by applying the second DL channel resource-based offset may further comprise allocating one additional UL radio resource unit 422 to the D2D pair 112, 122, wherein the one additional UL radio resource unit 422 is configured to be allocated to one additional DL radio resource unit 412.

In the simplest case scenario of this second group of embodiments, which is illustrated in a representative example in FIG. 4, the D2D pair may have been allocated the DL radio resource unit 411. In this case, the number of UL radio resource units may also be one: 421, as the allocation ratio may be 1:1. For these embodiments, the network node 110 may allocate the UL radio resource unit 421 to the first wireless device 121, and allocate an extra UL radio resource unit 422 to the second wireless device 122. In this case, the network node 110 may need to take further action with the DL radio resource unit to which the 422 UL radio resource unit is allocated, so that the additional DL radio resource unit 412, and in turn the extra UL radio resource unit 422, may not be allocated to a third wireless device, such as wireless device 123. This will be detailed below, for action 205.

This second DL channel resource-based offset allocation may guarantee that the transmissions from the different devices 121, 122 of the D2D pair, may not interfere with one another. In the example shown in FIG. 4, where the DL radio resources is 1 CCE, each of the devices 121, 122 in the D2D pair may transmit on a different resource block in the UL, thus avoiding causing interference to one another. A similar example to that of FIG. 4, is indicated, although not shown in FIG. 6, for UL resource unit 6211, i.e., delta shift 1. UL resource unit 6211 may be allocated to the first wireless device 121, and an additional UL resource unit (not shown) may be allocated to the second wireless device 122, in a similar manner as that shown in FIG. 4.

In some particular embodiments, at least one of the first and second DL channel resource-based offset may be a Physical Downlink Control Channel, PDCCH, Control Channel Element, CCE, -based offset, that is, an offset based on setting an appropriate CCE to avoid interference between UL transmissions from the first wireless device 121, and the second wireless device 122. In the first DL channel resource-based offset this is done by allocating an even number of CCEs, and in the second DL channel resource-based offset this is done by using an additional CCE, as described above.

The embodiments just described above avoid waste of DL radio resources, such as PDSCH waste. However, the latter embodiments referring to FIGS. 4 and 6, for the 1:1 ratio, may cause waste of other DL radio resources, such as the PDCCH in some degree. In order to further avoid the waste of DL radio resources, other embodiments may avoid collision of UL signaling, such as PUCCH resource collision, by resorting to a code-division multiplexing offset such as the deltaPUCCH-Shift, as will be described below for the following embodiments.

In Release 10 of the 3GPP specification, UL multi-antenna use is introduced into PUCCH transmission, so two antennas of a single wireless device 121, 122, 123 may occupy different PUCCH resources, i.e., Spatial Orthogonal-Resource Transmit Diversity (SORTD) scheme is used for PUCCH transmission so that PUCCH resource N may be used by antenna port 0, and resource N+1 may be used by antenna port 1. When the deltaPUCCH-Shift is set to a value larger than 1, the interval between adjacent PUCCH can be used for an UL multi-antenna scenario. That is, for example, the two antennas of a device UE3, such as the third device 123, or a D2D wireless device other than the first wireless device 121 or the second wireless device 122, may use, respectively, PUCCH UL radio resource units 523 and 524 as shown in FIG. 5 for a UE3. This may be done to provide diversity gain (deltaPUCCH-Shift=2 in this figure). Similarly, as also shown in FIG. 5, the delta-shift may be used by two D2D devices to differentiate UL transmission, where the two D2D devices are actually treated as two antennas in the traditional scenario. The two D2D devices 121, 122 may follow the current UL multi-antenna scheme, i.e., each of the devices 121, 122 may act as one "antenna", so that the PUCCH interval is utilized by the other device. While there may be no limit on the number of antennas each D2D device 121, 122 may use, only one UL radio resource may be used.

According to the foregoing, in a third group of embodiments, each one of the DL radio resource units 511, 512, 611 may be, by default, configured to be allocated two UL radio resource units 521, 522, 523, 524, 6221, 6222, and the allocating DL radio resources 510, 610 may comprise allocating one DL radio resource unit 511, 611 associated with the common DL control signalling message to the D2D pair 121, 122. In these embodiments, the one or more of a time offset, a frequency offset and a code-division multiplexing offset may be a first UL channel-shift-based offset. According to this first UL channel-shift-based offset, the allocating UL radio resources 520, 620 by applying the first UL channel-shift-based offset may further comprise allocating a first UL radio resource unit 521, 6221 to the first wireless device 121 and a second UL radio resource unit 522, 6222 to the second wireless device 122.

In the simplest case scenario of this third group of embodiments, which is illustrated in a representative example in FIG. 5, the D2D pair may have been allocated one DL radio resource unit 511. In this case, the number of UL radio resource units may be two: 521 and 522, as the allocation ratio is 1:2. Hence, the network node 110 may allocate an UL radio resource unit such as unit 521 to one of the devices in the pair, for example the first wireless device 121, and it may allocate the other UL radio resource unit 522 to the other device in the pair, in this example, the second wireless device 122. This offset allocation may guarantee that the transmission from the different members 121, 122 of the D2D pair, may not collide. In the example shown in FIG. 5, where the DL radio resource is 1 CCE, each of the devices 121, 122 in the D2D pair may transmit on a different resource block in the UL, thus avoiding a collision. A similar example to that of FIG. 5, is shown also in FIG. 6 for UL resource units 6211 and 6212, i.e., delta shift 2.

In a fourth group of embodiments, each one of the DL radio resource units 611 may be, by default, configured to be allocated three UL radio resource units 6231-6233. The allocating DL radio resources 610 may comprise allocating one DL radio resource unit 611 associated with the common DL control signalling message to the D2D pair 121, 122. In these embodiments, the one or more of a time offset, a frequency offset and a code-division multiplexing offset may be a second UL channel-shift-based offset. According to this second UL channel-shift-based offset, the allocating UL radio resources 620 by applying the second UL channel-shift-based offset may further comprise allocating a first UL radio resource unit 6231 to the first wireless device 121, allocating a second UL radio resource unit 6232 to the second wireless device 122.

In the simplest case scenario of this fourth group of embodiments, which is illustrated in a representative example in FIG. 6, the D2D pair may have been allocated one DL radio resource unit 611. In this case, the number of UL radio resource units may be three: 6231-6233, as the allocation ratio may be 1:3. Hence, the network node 110 may allocate an UL radio resource unit such as unit 6231 to one of the devices in the pair, for example the first wireless device 121, and it may allocate one of the other two UL radio resource units, for example UL radio resource unit 6232 to the other device in the pair, in this example, the second wireless device 122, as shown in FIG. 6 for Delta-shift 3. This offset allocation may guarantee that the transmission from the different members of the D2D pair 121, 122, may not collide. In the example shown in FIG. 6, where the DL resource is 1 CCE, each of the devices in the pair may transmit on a different resource block in the UL, thus avoiding a collision.

In some particular embodiments, at least one of the first and second UL channel-shift based offset may be a delta-Physical Uplink Control Channel, PUCCH, -Shift based offset, that is, an offset based on setting an appropriate delta PUCCH-shift to avoid interference between UL transmissions from the first wireless device 121, and the second wireless device 122.

In all these different groups of embodiments, the question arises as to which of the two devices in the D2D pair may be designated as the first wireless device 121, and which may be designated as the second wireless device 122. That is, if the UL radio resources 320, 420, 520, 620, 720, 820, 920 comprise two separate resources x and y, how may the allocating of resource x and resource y be done to one of the two member 121, 122 of the D2D pair.

According to embodiments herein, allocating UL radio resources (320, 420, 520, 620, 720, 820, 920) may comprise allocating resource x and resource y according to an implicit scheme, wherein the implicit scheme may be based on a feature that, when the allocating UL radio resources is performed, distinguishes the first wireless device 121 from the second wireless device 122, or according to an explicit scheme such as dedicated signalling.

The implicit scheme refers to pre-defined rules that distinguish between the two members of the D2D pair 121, 122. For example, to discover the D2D peer, or probe the D2D link periodically, there may be one beacon transmitter device and one beacon receiver device. According to the different roles during the peer discovery stage, UL radio resource division may be established automatically, so that, for example the beacon transmitter may be designated as the first wireless device 121, and be allocated UL radio resources accordingly, and the beacon receiver may be designated as the second wireless device 122, and be allocated UL radio resources accordingly. This may also be done in the reverse way in some embodiments. In other embodiments, other features of the D2D pair members 121, 122 may be used to designate one of them as the first wireless device 121, and the other as the second wireless device 122. These features are not meant to be limiting. Other suitable features may be apparent to those of skill in the art.

The explicit scheme refers to the embodiments in which the network node 110 may control the allocation of UL radio resources by using a dedicated signalling to either member of the D2D pair, for example, by using two individual identifiers of the D2D devices 121, 122, such as a Cellular Radio Network Temporary Identifier (C-RNTI). In other embodiments, this may be done according to other features distinguishing the two members of the D2D pair. These examples of features are not meant to be limiting. Other features will be apparent to one of skill in the art.

In the embodiments described herein, the network node 110 may communicate with the wireless devices 121, 122 in the D2D pair to designate one as the first wireless device 121 and the other as the second wireless device 122 via RRC signalling or MAC CE signalling.

Action 204

In some of the embodiments described above in FIGS. 6-9, wherein the number of UL radio resources 6231-6233, 7221-7234, 8211-8234, 9211-9234 is higher than two, there may be UL radio resource units that may remain unallocated, as a consequence of the allocation method of UL radio resources between wireless devices 121, 122 of the D2D pair. Such is the case of UL radio resource units 7222, 7224, 7232, 7234, 8212, 8214, 8222, 8224, 8232, 8234, 9212, 9214, 9222, 9224, 9232, 9234. In some of these cases, the network node 110 may take further action to prevent allocation of these unallocated radio resource units, and avoid or reduce interference with transmission from the first wireless device 121 or the second wireless device 122.

When the number of UL radio resources 7221-7234, 8211-8234, 9211-9234 is higher than two, so that a number of UL radio resource units 7222, 7224, 7232, 7234, 8212, 8214, 8222, 8224, 8232, 8234, 9212, 9214, 9222, 9224, 9232, 9234 is unallocated to either one of the first wireless device 121 and the second wireless device 122, the method may further comprise: disallowing allocation of each unallocated UL radio resource unit 7222, 7224, 7232, 7234, 8212, 8214, 8222, 8224, 8232, 8234, 9212, 9214, 9222, 9224, 9232, 9234. That is, in some embodiments, the network node 110 may ensure that the UL radio resource units that are unallocated to either one of the first wireless device 121 and the second wireless device 122, that is UL radio resource units 7222, 7224, 7232, 7234, 8212, 8214, 8222, 8224, 8232, 8234, 9212, 9214, 9222, 9224, 9232, 9234, are not allocated to either device by leaving them reserved, to reduce interference.

In some embodiments, the network node 110 may disallow all unallocated radio resource units in each of the first half and the second half of the even number UL radio resource units 7222, 7224, 7232, 7234, 8212, 8214, 8222, 8224, 8232, 8234, 9212, 9214, 9222, 9224, 9232, 9234. In other embodiments, the network node 110 may disallow allocation of a third UL radio resource unit 6233. These disallowed UL radio resource units are marked as "reserved" in FIGS. 6-9.

In some embodiments, this action 205 may not be performed.

Action 205

In the embodiments described above in which the network node 110 may allocate an additional UL radio resource unit 422 to the D2D pair 121, 122, which additional UL radio resource unit 422 may be configured to be allocated to one additional DL radio resource unit 412, the network node 110 may disallow allocation of the additional DL radio resource unit 412. This may be done to prevent that another wireless devices, such as the third wireless device 123 be allocated the additional DL radio resource unit 412, and then potentially create a collision with the transmission of the second wireless device 122 allocated in the additional radio resource unit 422. There are multiple available DL radio resource units to choose from for allocation to any wireless device. Since it is fully up to the network node 110 to decide which DL radio resource units to allocate or not, the network node 110 may use DL resource units in the available DL resource unit set, other than that disallowed for allocation to a third wireless device, such as the wireless device 123, or another D2D device. That is, the network node 110 may ensure that the additional DL radio resource unit 412 is not allocated to another wireless device, such as the third wireless device 123, or another D2D device, i.e., the network node 110 may leave this additional DL radio resource unit 412 idle.

Action 206

In the particular embodiments in which the UL radio resources 320, 420, 520, 620, 720, 820, 920 comprise resources for a PUCCH, wherein the PUCCH comprises a NACK in response to signalling sent to one of the D2D devices 121, 122, the network node 100, may need to retransmit the signalling to the device that has sent the NACK. In the embodiments in which both devices 121, 122 in the D2D pair send a NACK, the network node 110 may retransmit the signalling by using a common identifier, such as the D2D-RNTI. However, in the embodiments in which only one device of the two devices 121, 122 in the D2D pair sends a NACK, the network node 110 may use an individual identifier for the device in the D2D pair that sent the NACK, so that the retransmission is only sent to the device in the D2D pair that sent the NACK. Thus, in this action 206, the network node 110 may assign an individual cellular identifier to one of the first wireless device 121 and the second wireless device 122 that sent the NACK.

In some particular embodiments, this individual identifier may be a C-RNTI.

In some other embodiments, this individual identifier may me a non-cellular identifier that permits the identification of each of the members 121, 122 of the D2D pair.

Action 207

HARQ is the simultaneous combination of Automatic Retransmission request (ARQ), and Forward Error Correction (FEC). It may enable the overhead of error correction to be adapted dynamically depending on the channel quality. When HARQ may be used, if the errors may be corrected by FEC, then no retransmission may be requested; if the errors may be detected but not corrected, a retransmission may be requested.

Thus, in this action 207, if the network node 110 receives a NACK from at least one of the devices 121, 122 in the D2D pair, the network node 110 may retransmit the signalling to the one of the first wireless device 121 and the second wireless device 122 that sent the NACK, based on the assigned individual cellular identifier. The network node 110 may retransmit the for example, PDCCH signalling, scrambled by an individual wireless device identifier, such as a Cellular RNTI (C-RNTI), to one of the first wireless device 121 and the second wireless device 122. In this case, since only one wireless device in the D2D pair 121, 122 would need to feedback an ACK/NACK, there may be no PUCCH resource interference.

Figure 10:
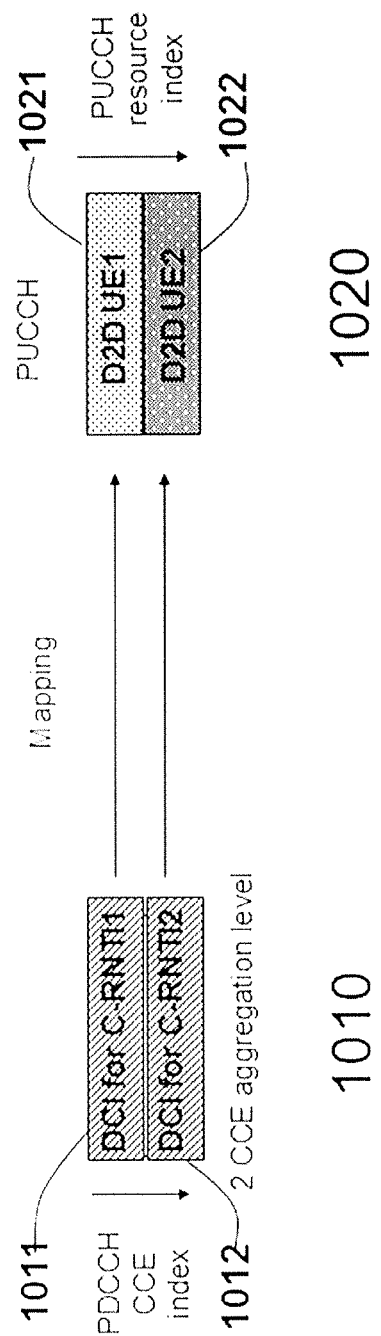
FIG. 10 is a schematic diagram illustrating embodiments of an UL radio resource allocation.

In some particular embodiments, such as that exemplified in FIG. 10, a different method for managing D2D control signalling may be used to avoid interference issues from UL transmission from each individual device in the pair of D2D devices 121, 122, such as in the case of ACK/NACK feedback. In these embodiments, two independent DL control signalling messages, such as two different DCIs, may be used for each device 121, 122 in the D2D pair. This may be done, for example, by using the two C-RNTIs of the two devices 121, 123, as illustrated in FIG. 10. As shown in FIG. 5, according to this embodiment, of the DL radio resources 1010, DL radio resource unit 1011 may be allocated to the DL control signalling message of the first wireless device 121, shown here as DCI for C-RNTI1. DL radio resource unit 1012 may be allocated to the DL control signalling message of the second wireless device 122, shown here as DCI for C-RNTI2. Of the UL radio resources 1020, UL radio resource unit 1021 may be allocated to the first wireless device 121, i.e., UE1. UL radio resource unit 1022 may be allocated to the second wireless device 122, i.e., UE2. In these embodiments, however, DL radio resources may not be saved, as in the previous embodiments, as they may be duplicated.

Figure 11:
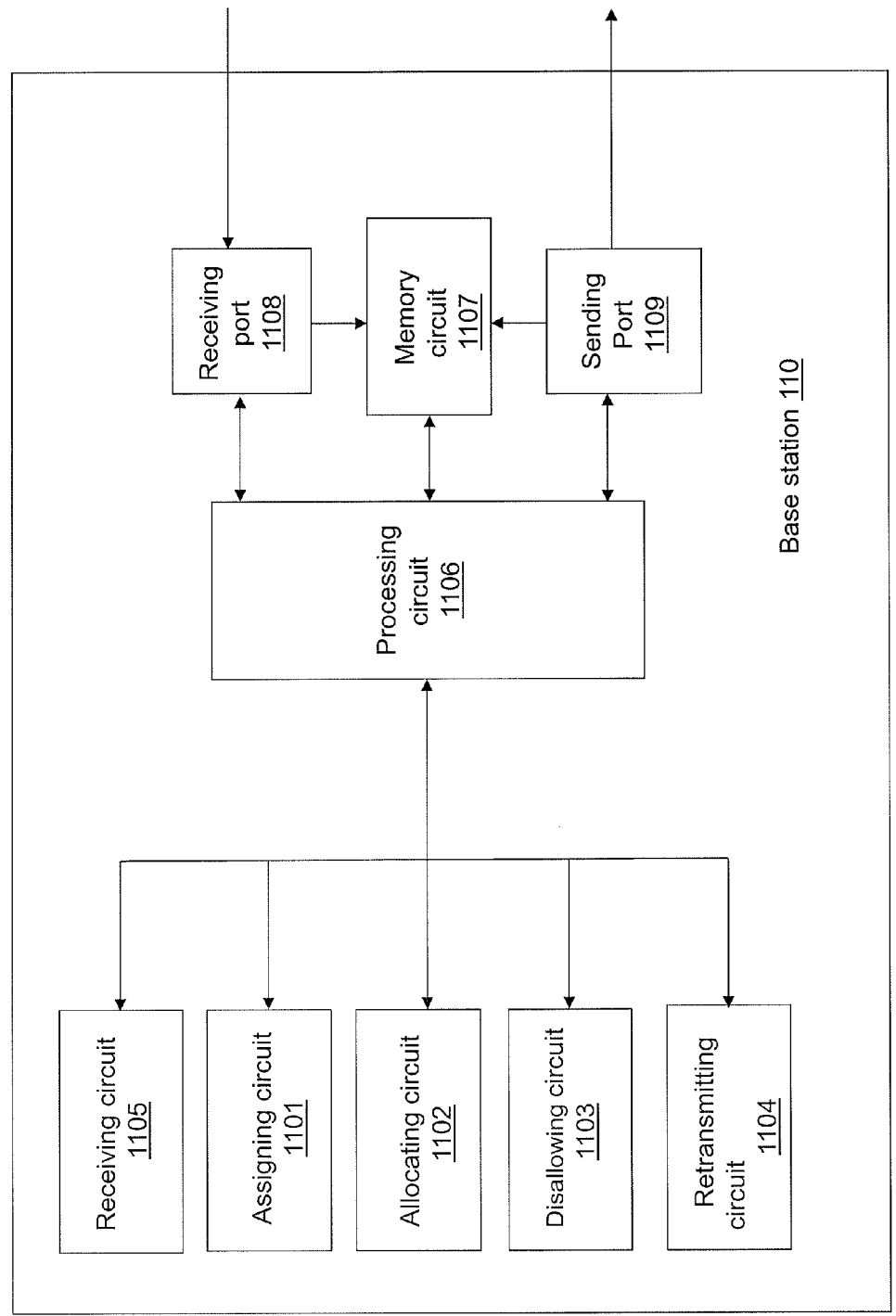
FIG. 11 is a schematic block diagram illustrating embodiments of a network node.

To perform the method actions in the network node 110 described above in relation to FIGS. 2-10 for allocating UL radio resources 420, 620 to a pair of D2D, devices 121, 122, comprising a first wireless device 121 and a second wireless device 122, the network node 110 comprises the following arrangement depicted in FIG. 11. As mentioned above, the network node 110 and the D2D pair 121, 122 are comprised in the wireless communications network 100.

The network node 110 comprises an assigning circuit 1101, configured to assign a common DL control signalling message, for the pair of D2D devices 121, 122; and an allocating circuit 1102 configured to allocate UL radio resources 320, 420, 520, 620, 720, 820, 920 to the first wireless device 121 and the second wireless device 122, so that the UL radio resources 321, 421, 521, 6221, 6231, 7211, 7221, 7231, 8211, 8221, 8231, 9211, 9221, 9231 allocated to the first wireless device 121 are separated from the UL radio resources 322, 422, 522, 6222, 6232, 7212, 7223, 7233, 8213, 8223, 8233, 9213, 9223, 9233 allocated to the second wireless device 122, by applying one or more of a time offset, a frequency offset and a code-division multiplexing offset between the UL radio resources allocated to the first wireless device 121 and the UL radio resources allocated to the second wireless device 122, wherein to allocate UL radio resources 320, 420, 520, 620, 720, 820, 920 is based on the common DL control signalling message.

In some embodiments, the assigning circuit (1101) may be further configured to assign a common DL identifier, for the pair of D2D devices (121, 122).

In some embodiments, the wireless communications network 100 may comprise DL radio resources 310, 410, 510, 610, 710, 810, 910, which DL radio resources 310, 410, 510, 610, 710, 810, 910 may comprise a number of DL radio resource units 311, 312, 411, 412, 511, 512, 611, 711, 712, 811-814, 911-918; the UL radio resources 320, 420, 520, 620, 720, 820, 920 may comprise a number of UL radio resource units 321, 322, 421, 422, 521-524, 6211, 6221, 6222, 6231-6233, 7211, 7212, 7221-7224, 7231-7234, 8211-8214, 8221-8224, 8231-8234, 9211-9214, 9221-9224, 9231-9234; and the network node 110 may further comprise an allocating circuit 1102 configured to allocate DL radio resources 310, 410, 510, 610, 710, 810, 910 to the D2D devices 121, 122 for the common DL control signalling message, wherein to allocate UL radio resources 320, 420, 520, 620, 720, 820, 920 may be based on the to allocate DL radio resources 310, 410, 510, 610, 710, 810, 910.

In some embodiments, the one or more of a time offset, a frequency offset and a code-division multiplexing offset may be a first DL channel resource-based offset; to allocate DL radio resources 310, 710, 810, 910 to the D2D devices 121, 122 may comprise to allocate an even number of DL radio resource units 311, 312, 711, 712, 811-814, 911-918 associated with the common DL control signalling message, which even number of DL radio resource units 311, 312, 711, 712, 811-814, 911-918 may be configured to be allocated an even number of UL radio resource units associated with the common DL control signalling message 321, 322, 7211, 7212, 7221-7224, 7231-7234, 8211-8214, 8221-8224, 8231-8234, 9211-9214, 9221-9224, 9231-9234; to allocate UL radio resources 320, 720, 820, 920 by applying the first DL channel resource-based offset may further comprise to allocate one UL radio resource unit 321, 7211, 7221, 7231, 8211, 8221, 8231, 9211, 9221, 9231 in a first half of the even number of UL radio resource units to the first wireless device 121 and to allocate one UL radio resource unit 322, 7212, 7223, 7233, 8213, 8223, 8233, 9213, 9223, 9233 in a second half of the even number UL radio resource units to the second wireless device 122; and the network node 110 may further comprise a disallowing circuit 1103 configured to, when the number of UL radio resources 7221-7234, 8211-8234, 9211-9234 is higher than two so that a number of UL radio resource units 7222, 7224, 7232, 7234, 8212, 8214, 8222, 8224, 8232, 8234, 9212, 9214, 9222, 9224, 9232, 9234 is unallocated to either one of the first wireless device 121 and the second wireless device 122, disallow allocation of each unallocated UL radio resource unit 7222, 7224, 7232, 7234, 8212, 8214, 8222, 8224, 8232, 8234, 9212, 9214, 9222, 9224, 9232, 9234 in each of the first half and the second half of the even number UL radio resource units.

In some embodiments, to allocate UL radio resources 720, 820, 920 by applying the first DL channel resource-based offset may further comprise to allocate the first wireless device 121 and the second wireless device 122 so that they are separated by all the unallocated UL radio resource units in the first half of the even number of UL radio resource units 7222, 7224, 7232, 7234, 8212, 8214, 8222, 8224, 8232, 8234, 9212, 9214, 9222, 9224, 9232, 9234.

In some embodiments, the even number of DL radio resource units may be one of two, four or eight.

In some other embodiments, the allocating circuit 1102 may be further configured to allocate one of the UL radio resource units 421, 422 to each of the DL radio resource units 411, 412; the one or more of a time offset, a frequency offset and a code-division multiplexing offset may be a second DL channel resource-based offset; to allocate DL radio resources 410 to the D2D devices 121, 122 may comprise to allocate one DL radio resource unit 411 associated with the common DL control signalling message, which one DL radio resource unit 411 may be configured to be allocated one UL radio resource unit 421 associated with the common DL control signalling message; to allocate UL radio resources 420 by applying the second DL channel resource-based offset may further comprise to allocate one additional UL radio resource unit 422 to the D2D pair 121, 122, wherein the one additional UL radio resource unit 422 may be configured to be allocated to one additional DL radio resource unit 412; to allocate 203 UL radio resources 420 may further comprise to allocate the one UL radio resource unit 421 to the first wireless device 121 and the one additional UL radio resource unit 422 to the second wireless device 122; and the network node 110 may further comprise a disallowing circuit 1103 configured to disallow allocation of the additional DL radio resource unit 412.

In some embodiments, at least one of the first and second DL channel resource-based offset may be a Physical Downlink Control Channel, PDCCH, Control Channel Element, CCE, -based offset.

In some embodiments, the allocating circuit 1102 may be further configured to allocate two UL radio resource units 521, 522, 523, 524, 6221, 6222 to each one of the DL radio resource units 511, 512, 611; the one or more of a time offset, a frequency offset and a code-division multiplexing offset may be a first UL channel-shift-based offset; to allocate DL radio resources 510, 610 may comprise to allocate one DL radio resource unit 511, 611 associated with the common DL control signalling message to the D2D pair 121, 122; and to allocate UL radio resources 520, 620 by applying the first UL channel-shift-based offset may further comprise to allocate a first UL radio resource unit 521, 6221 to the first wireless device 121 and a second UL radio resource unit 522, 6222 to the second wireless device 122.

In some embodiments, the allocating circuit 1102 may be further configured to allocate three UL radio resource units 6231-6233 to each one of the DL radio resource units 611; the one or more of a time offset, a frequency offset and a code-division multiplexing offset may be a second UL channel-shift-based offset; to allocate DL radio resources 610 may comprise to allocate one DL radio resource unit 611 associated with the common DL control signalling message to the D2D pair 121, 122; and to allocate UL radio resources 620 by applying the second UL channel-shift-based offset may further comprise to allocate a first UL radio resource unit 6231 to the first wireless device 121, and to allocate a second UL radio resource unit 6232 to the second wireless device 122; and the disallowing circuit 1103 may be further configured to disallow allocation of the third UL radio resource unit 6233.

In some embodiments, at least one of the first and second UL channel-shift based offset may be a deltaPhysical Uplink Control Channel, PUCCH, -Shift based offset.

In some of embodiments, the UL radio resources 320, 420, 520, 620, 720, 820, 920 may comprise two separate resources x and y; and to allocate UL radio resources (320, 420, 520, 620, 720, 820, 920) may comprise to allocate resource x and resource y, according to: an implicit scheme, wherein the implicit scheme may be based on a feature that, when to allocate UL radio resources is performed, distinguishes the first wireless device 121 from the second wireless device 122; or dedicated signalling.

In some embodiments, the UL radio resources 320, 420, 520, 620, 720, 820, 920 may comprise Acknowledgement/Negative Acknowledgement, ACK/NACK, feedback.

In some embodiments, the UL radio resources 320, 420, 520, 620, 720, 820, 920 may comprise resources for a PUCCH, wherein the PUCCH may comprise a NACK in response to signalling sent to one of the D2D devices 121, 122; and the network node 110 may further comprise: an assigning circuit 1101 configured to assign an individual cellular identifier to one of the first wireless device 121 and the second wireless device 122 that sent the NACK; and a retransmitting circuit 1104 configured to retransmit the signalling to the one of the first wireless device 121 and the second wireless device 122 that sent the NACK.

In some embodiments, a DL radio resource unit may be a control channel element, and an UL radio resource unit may be a resource block.

In some further embodiments, the network node 110 may comprise a receiving circuit 1105 configured to receive signalling from, for example, the first wireless device 121, the second wireless device 122, and the third wireless device 123. An example of such signalling may be an ACK/NACK response.

In some embodiments, at least one of the assigning circuit 1101, the allocating circuit 1102, the disallowing circuit 1103, the retransmitting circuit 1104, and the receiving circuit 1105 may be comprised in a scheduler. The scheduler may manage the cellular communications of devices such as the third wireless device 123, as well as the D2D communications of devices such as the first wireless device 121 and the second wireless device 122. The scheduler determines if, which and when devices have the possibility to communicate in a direct D2D communication. The scheduler may provision a discovery signal to be used between two devices to determine their proximity and/or D2D link estimation. It may also assign resources for the D2D discovery signal and/or a D2D data channel and/or a D2D control channel. It may relay information between the at least two devices, and it may configure connection parameters for the at least two devices of the D2D link, such as power setting, e.g., actual, min, max, coding and modulation schemes, segmentation configuration, e.g., transport block sizes, parameters and/or security keys for encryption/integrity protection, protocol parameters, which Radio Access Technology, spectrum/carrier to use for D2D link. Typically, the scheduler may be co-located with the network node 110. The network node co-located with the scheduler may be in some embodiments: a base station, a stationary relay node—not pictured—, a mobile relay node—not pictured—, the first wireless device 121, the second wireless device 122, the third wireless device 123, or a wireless device other than the first wireless device 121, the second wireless device 122 and the third wireless device 123. The scheduler may be capable of communicating with devices such as the first wireless device 121, the second wireless device 122 and the third wireless device 123 over a respective scheduler link. The scheduler may also communicate with other devices over other D2D scheduler links.

The embodiments herein for handling a D2D communication may be implemented through one or more processors, such as a processing circuit 1106 in the network node 110 depicted in FIG. 11, together with computer program code for performing the functions and actions of the embodiments herein. The program code mentioned above may also be provided as a computer program product, for instance in the form of a data carrier carrying computer program code for performing the embodiments herein when being loaded into the in the network node 110. One such carrier may be in the form of a CD ROM disc. It may be however feasible with other data carriers such as a memory stick. The computer program code may furthermore be provided as pure program code on a server and downloaded to the network node 110.

The network node 110 may further comprise a memory circuit 1107 comprising one or more memory units. The memory circuit 1107 may be arranged to be used to store data such as, the information received by the processing circuit 1106 in relation to signalling from the D2D pair 121, 122, and applications to perform the methods herein when being executed in the network node 110. Memory circuit 1107 may be in communication with the processing circuit 1106. Any of the other information processed by the processing circuit 1106 may also be stored in the memory circuit 1107.

In some embodiments, signalling from the D2D pair 121, 122 or the third wireless device 123 may be received through a receiving port 1108. The receiving port 1108 may be in communication with the processing circuit 1106. The receiving port 1108 may be configured to receive other information.

The processing circuit 1106 may be further configured to send signalling to the D2D pair 121, 122, or the third wireless device 123 through a sending port 1109, which may be in communication with the processing circuit 1106, and the memory circuit 1107

Those skilled in the art will also appreciate that the assigning circuit 1101, the allocating circuit 1102, the disallowing circuit 1103, the retransmitting circuit 1604 and the receiving circuit 1605 described above may refer to a combination of analog and digital circuits, and/or one or more processors configured with software and/or firmware (e.g., stored in memory) that, when executed by the one or more processors such as the processing circuit 1106, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a network node for allocating uplink (UL) radio resources to a pair of Device to Device (D2D) devices comprising a first wireless device and a second wireless device, wherein the network node and the D2D pair are comprised in a wireless communications network, and wherein the method comprises:
    assigning a common downlink (DL) control signalling message, for the pair of D2D devices; and allocating UL radio resources to the first wireless device and the second wireless device, so that the UL radio resources allocated to the first wireless device are separated from the UL radio resources allocated to the second wireless device, by applying one or more of a time offset, a frequency offset, and a code-division multiplexing offset between the UL radio resources allocated to the first wireless device and the UL radio resources allocated to the second wireless device, wherein the allocating UL radio resources is based on the common DL control signalling message, wherein the wireless communications network comprises DL radio resources, wherein the DL radio resources comprise a number of DL radio resource units, wherein the UL radio resources comprise a number of UL radio resource units;

allocating DL radio resources to the D2D devices for the common DL control signalling message, wherein the allocating UL radio resources is based on the allocating DL radio resources; and disallowing allocation of each unallocated radio resource unit or additional DL radio resource unit, such that:
  a) when the number of UL radio resources is higher than two, so that a number of UL radio resource units is unallocated to either one of the first wireless device and the second wireless device, disallowing allocation of each unallocated UL radio resource unit, and
  b) when each of the DL radio resource units is configured to be allocated one of the UL radio resource units,
    wherein the one or more of the time offset, the frequency offset, and the code-division multiplexing offset is a second DL channel resource-based offset,
    wherein the allocating DL radio resources to the D2D devices comprises allocating one DL radio resource unit associated with the common DL control signalling message, which one DL radio resource unit is configured to be allocated one UL radio resource unit associated with the common DL control signalling message,
    wherein the allocating UL radio resources by applying the second DL channel resource-based offset further comprises allocating one additional UL radio resource unit to the D2D pair, wherein the one additional UL radio resource unit is configured to be allocated to one additional DL radio resource unit,
    wherein the allocating UL radio resources further comprises allocating the one UL radio resource unit to the first wireless device and the one additional UL radio resource unit to the second wireless device,
    disallowing allocation of the additional DL radio resource unit.

2. The method of claim 1 further comprising assigning a common DL identifier, for the pair of D2D devices.

3. The method of claim 1, wherein the one or more of the time offset, the frequency offset, and the code-division multiplexing offset is a first DL channel resource-based offset,
  wherein the allocating DL radio resources to the D2D devices comprises allocating an even number of DL radio resource units associated with the common DL control signalling message, wherein the even number of DL radio resource units are configured to be allocated an even number of UL radio resource units associated with the common DL control signalling message,
  wherein the allocating UL radio resources by applying the first DL channel resource-based offset further comprises allocating one UL radio resource unit in a first half of the even number of UL radio resource units to the first wireless device and allocating one UL radio resource unit in a second half of the even number UL radio resource units to the second wireless device.

4. The method of claim 3, wherein the allocating UL radio resources by applying the first DL channel resource-based offset further comprises allocating the first wireless device and the second wireless device so that they are separated by all the unallocated UL radio resource units in the first half of the even number of UL radio resource units.

5. The method of claim 3, wherein the even number of DL radio resource units is one of two, four, and eight.

6. The method of claim 3, wherein at least one of the first and second DL channel resource-based offset is a Physical Downlink Control Channel (PDCCH), Control Channel Element (CCE)-based offset.

7. The method of claim 1, wherein each one of the DL radio resource units is configured to be allocated three UL radio resource units,
  wherein the one or more of the time offset, the frequency offset, and the code-division multiplexing offset is a second UL channel-shift-based offset,
  wherein the allocating DL radio resources comprises allocating one DL radio resource unit associated with the common DL control signalling message to the D2D pair, and
  wherein the allocating UL radio resources by applying the second UL channel-shift-based offset further comprises allocating a first UL radio resource unit to the first wireless device, allocating a second UL radio resource unit to the second wireless device, and disallowing allocation of a third UL radio resource unit.

8. The method of claim 7, wherein at least one of the first and second UL channel-shift based offset is a deltaPhysical Uplink Control Channel (PUCCH)-Shift based offset.

9. The method of claim 1, wherein the UL radio resources comprise two separate resources x and y, and wherein the allocating UL radio resources comprises allocating resource x and resource y, according to:
  an implicit scheme, wherein the implicit scheme is based on a feature that, when the allocating UL radio resources is performed, distinguishes the first wireless device from the second wireless device, or
  according to dedicated signalling.

10. The method of claim 1, wherein the UL radio resources comprise Acknowledgement/Negative Acknowledgement (ACK/NACK) feedback.

11. The method of claim 1, wherein the UL radio resources comprise resources for a Physical Uplink Control Channel (PUCCH), and wherein the PUCCH comprises a NACK in response to signalling sent to one of the D2D devices and wherein the method further comprises:
  assigning an individual cellular identifier to one of the first wireless device and the second wireless device that sent the NACK; and
  retransmitting the signalling to the one of the first wireless device and the second wireless device that sent the NACK.

12. The method of claim 1, wherein the DL radio resource unit is a control channel element, and the UL radio resource unit is a resource block.

13. A network node for allocating uplink (UL) radio resources to a pair of Device to Device (D2D) devices comprising a first wireless device and a second wireless device, wherein the network node and the D2D pair are comprised in a wireless communications network, the network node comprising:
an assigning circuit configured to assign a common downlink (DL) control signalling message, for the pair of D2D devices;
an allocating circuit configured to allocate UL radio resources to the first wireless device and the second wireless device, so that the UL radio resources allocated to the first wireless device are separated from the UL radio resources allocated to the second wireless device, by applying one or more of a time offset, a frequency offset, and a code-division multiplexing offset between the UL radio resources allocated to the first wireless device and the UL radio resources allocated to the second wireless device, wherein allocating UL radio resources is based on the common DL control signalling message,
wherein the wireless communications network comprises DL radio resources, wherein DL radio resources comprise a number of DL radio resource units, wherein the UL radio resources comprise a number of UL radio resource units;
an allocating circuit configured to allocate DL radio resources to the D2D devices for the common DL control signalling message, wherein allocating UL radio resources is based on allocating DL radio resources; and
a disallowing circuit configured to disallow allocation of each unallocated UL radio resource unit or additional DL radio resource unit, such that:
a) when the number of UL radio resources is higher than two so that a number of UL radio resource units is unallocated to either one of the first wireless device and the second wireless device, the disallowing circuit is configured to disallow allocation of each unallocated UL radio resource unit in each of the first half and the second half of even number UL radio resource units, and
b) when the allocating circuit is further configured to allocate one of the UL radio resource units to each of the DL radio resource units,
wherein the one or more of the time offset, the frequency offset, and the code-division multiplexing offset is a second DL channel resource-based offset,
wherein allocating DL radio resources to the D2D devices comprises allocating one DL radio resource unit associated with the common DL control signalling message, wherein one DL radio resource unit is configured to be allocated one UL radio resource unit associated with the common DL control signalling message,
wherein allocating UL radio resources by applying the second DL channel resource-based offset further comprises allocating one additional UL radio resource unit to the D2D pair, wherein the one additional UL radio resource unit is configured to be allocated to one additional DL radio resource unit,
wherein allocating UL radio resources further comprises allocating the one UL radio resource unit to the first wireless device and the one additional UL radio resource unit to the second wireless device,
the disallowing circuit is configured to disallow allocation of the additional DL radio resource unit.

14. The network node of claim 13, wherein the assigning circuit is further configured to assign a common DL identifier, for the pair of D2D devices.

15. The network node of claim 13, wherein the one or more of the time offset, the frequency offset, and the code-division multiplexing offset is a first DL channel resource-based offset,
wherein allocating DL radio resources to the D2D devices comprises allocating an even number of DL radio resource units associated with the common DL control signalling message, which even number of DL radio resource units are configured to be allocated an even number of UL radio resource units associated with the common DL control signalling message,
wherein allocating UL radio resources by applying the first DL channel resource-based offset further comprises allocating one UL radio resource unit in a first half of the even number of UL radio resource units to the first wireless device and allocating one UL radio resource unit in a second half of the even number UL radio resource units to the second wireless device.

16. The network node of claim 15, wherein allocating UL radio resources by applying the first DL channel resource-based offset further comprises allocating the first wireless device and the second wireless device so that they are separated by all the unallocated UL radio resource units in the first half of the even number of UL radio resource units.

17. The network node of claim 15, wherein the even number of DL radio resource units is one of two, four, and eight.

18. The network node of claim 13, wherein at least one of the first and second DL channel resource-based offset is a Physical Downlink Control Channel (PDCCH), Control Channel Element (CCE)-based offset.

19. The network node of claim 13, wherein the allocating circuit is further configured to allocate three UL radio resource units to each one of the DL radio resource units,
wherein the one or more of the time offset, the frequency offset, and the code-division multiplexing offset is a second UL channel-shift-based offset,
wherein allocating DL radio resources comprises allocating one DL radio resource unit associated with the common DL control signalling message to the D2D pair, and
wherein allocating UL radio resources by applying the second UL channel-shift-based offset further comprises allocating a first UL radio resource unit to the first wireless device, and allocating a second UL radio resource unit to the second wireless device, and
wherein the disallowing circuit is further configured to disallow allocation of a third UL radio resource unit.

20. The network node of claim 19, wherein at least one of the first and second UL channel-shift based offset is a deltaPhysical Uplink Control Channel (PUCCH)-Shift based offset.

* * * * *